US010601592B2

(12) United States Patent
Rose et al.

(10) Patent No.: US 10,601,592 B2
(45) Date of Patent: *Mar. 24, 2020

(54) SYSTEM AND METHOD TRUSTED WORKSPACE IN COMMERCIAL MOBILE DEVICES

(71) Applicants: Kenneth Hugh Rose, Annapolis, MD (US); Mark Stanley Krawczewicz, Annapolis, MD (US)

(72) Inventors: Kenneth Hugh Rose, Annapolis, MD (US); Mark Stanley Krawczewicz, Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,584

(22) Filed: Sep. 10, 2018

(65) Prior Publication Data
US 2019/0081788 A1    Mar. 14, 2019

Related U.S. Application Data

(63) Continuation-in-part of application No. 15/730,929, filed on Oct. 12, 2017, now Pat. No. 10,387,689.
(Continued)

(51) Int. Cl.
*H04L 9/32* (2006.01)
*H04L 9/00* (2006.01)
*G06F 9/4401* (2018.01)

(52) U.S. Cl.
CPC ............ *H04L 9/3213* (2013.01); *H04L 9/007* (2013.01); *H04L 9/3226* (2013.01);
(Continued)

(58) Field of Classification Search
CPC ........ G06F 21/85; G06F 9/4411; H04W 4/80; H04W 12/06; H04B 5/0062; H04L 9/32;
(Continued)

(56) References Cited

U.S. PATENT DOCUMENTS 8,594,563 B2 * 11/2013 Waters ................ H04L 63/0853
455/41.1
8,880,027 B1 * 11/2014 Darringer ............... G06F 21/35
455/41.1

(Continued)

*Primary Examiner* — J. Brant Murphy
(74) *Attorney, Agent, or Firm* — 24IP Law Group USA, PLLC; Timothy R DeWitt

(57) ABSTRACT

A system and method for creating a trusted workspace on a commercial mobile device using a cryptographic security token having a secure microprocessor, a secure bus connected to said secure microprocessor, a bus isolation microcontroller connected to said secure bus wherein said bus isolation microcontroller comprises firmware for controlling communications through said secure bus to said secure microprocessor, a first NFC antenna connected to said bus isolation microcontroller, and a second NFC antenna connected to said secure microprocessor. The secure microprocessor and said bus isolation microprocessor are powered by energy received through said first NFC antenna and said second NFC antenna. The cryptographic security token receives data from outside said cryptographic security token only through said first NFC antenna. The token or module may further have a bi-state or bi-stable display and a secure memory, each connected to the secure microprocessor by a secure bus.

3 Claims, 12 Drawing Sheets

Related U.S. Application Data

(60) Provisional application No. 62/556,302, filed on Sep. 8, 2017, provisional application No. 62/562,329, filed on Sep. 22, 2017, provisional application No. 62/562,329, filed on Sep. 22, 2017.

(52) U.S. Cl.
CPC .......... *H04L 9/3268* (2013.01); *G06F 9/4411* (2013.01); *H04L 2209/80* (2013.01)

(58) Field of Classification Search
CPC ..... H04L 9/3213; H04L 9/007; H04L 9/3268; H04L 9/3226; H04L 2209/80
See application file for complete search history.

(56) References Cited

U.S. PATENT DOCUMENTS

| | | | | |
|---|---|---|---|---|
| 9,420,403 | B1* | 8/2016 | Annan | H04W 4/80 |
| 9,674,785 | B2* | 6/2017 | Enomoto | H04W 52/0225 |
| 2004/0153672 | A1* | 8/2004 | Watt | G06F 9/3012 |
| | | | | 726/22 |
| 2006/0208066 | A1* | 9/2006 | Finn | G06K 7/0004 |
| | | | | 235/380 |
| 2009/0199004 | A1* | 8/2009 | Krawczewicz | G06K 19/0718 |
| | | | | 713/172 |
| 2009/0215385 | A1* | 8/2009 | Waters | H04L 63/0853 |
| | | | | 455/1 |
| 2010/0088188 | A1* | 4/2010 | Kumar | G06Q 20/10 |
| | | | | 705/17 |
| 2011/0185183 | A1* | 7/2011 | Yamamoto | G06F 21/33 |
| | | | | 713/182 |
| 2012/0159148 | A1* | 6/2012 | Behren | G06Q 20/3552 |
| | | | | 713/150 |
| 2012/0321084 | A1* | 12/2012 | Le Saint | H04L 9/3234 |
| | | | | 380/277 |
| 2012/0323717 | A1* | 12/2012 | Kirsch | G06Q 20/0855 |
| | | | | 705/26.1 |
| 2013/0097348 | A1* | 4/2013 | Milbrandt | G06F 13/36 |
| | | | | 710/110 |
| 2013/0152185 | A1* | 6/2013 | Singh | G06F 21/35 |
| | | | | 726/9 |
| 2013/0191232 | A1* | 7/2013 | Calman | G07F 19/201 |
| | | | | 705/18 |
| 2013/0200146 | A1* | 8/2013 | Moghadam | G06Q 40/04 |
| | | | | 235/379 |
| 2013/0232082 | A1* | 9/2013 | Krawczewicz | G06F 19/324 |
| | | | | 705/55 |
| 2014/0075567 | A1* | 3/2014 | Raleigh | H04W 12/10 |
| | | | | 726/26 |
| 2014/0149746 | A1* | 5/2014 | Yau | G06F 21/35 |
| | | | | 713/185 |
| 2014/0207680 | A1* | 7/2014 | Rephlo | G06Q 20/322 |
| | | | | 705/44 |
| 2015/0012437 | A1* | 1/2015 | Park | G06Q 20/4014 |
| | | | | 705/44 |
| 2015/0282085 | A1* | 10/2015 | Enomoto | H04W 52/0225 |
| | | | | 455/574 |
| 2016/0125180 | A1* | 5/2016 | Smith | H04L 9/0822 |
| | | | | 726/7 |
| 2016/0156386 | A1* | 6/2016 | Van Nieuwenhuyze | G06K 7/10237 |
| | | | | 455/41.1 |
| 2016/0306977 | A1* | 10/2016 | Zarakas | G06F 8/654 |
| 2016/0335619 | A1* | 11/2016 | Ce | G06Q 20/02 |
| 2017/0156022 | A1* | 6/2017 | Keller | H04B 5/0031 |

\* cited by examiner

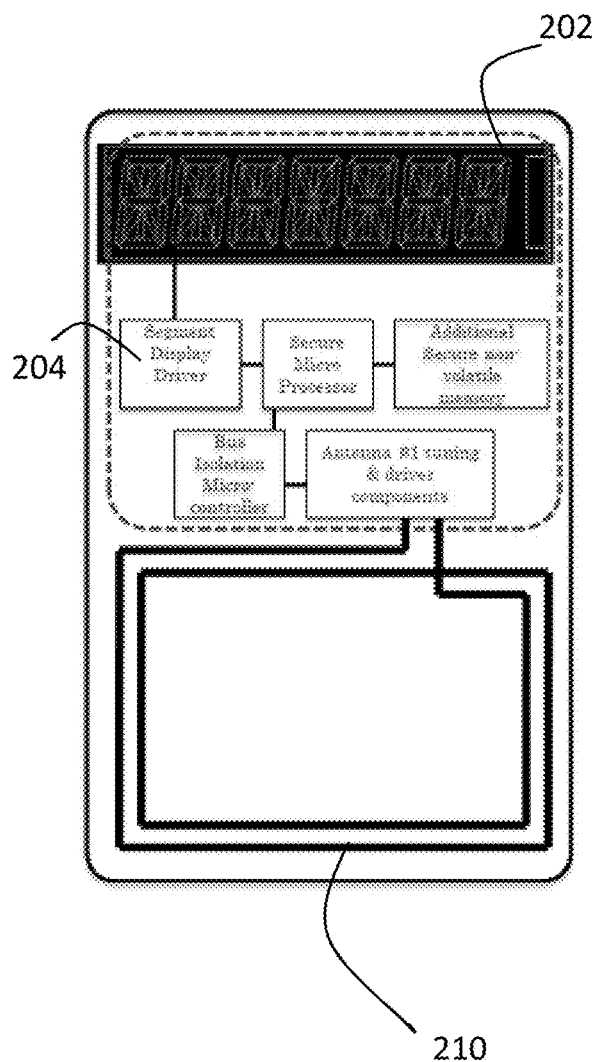
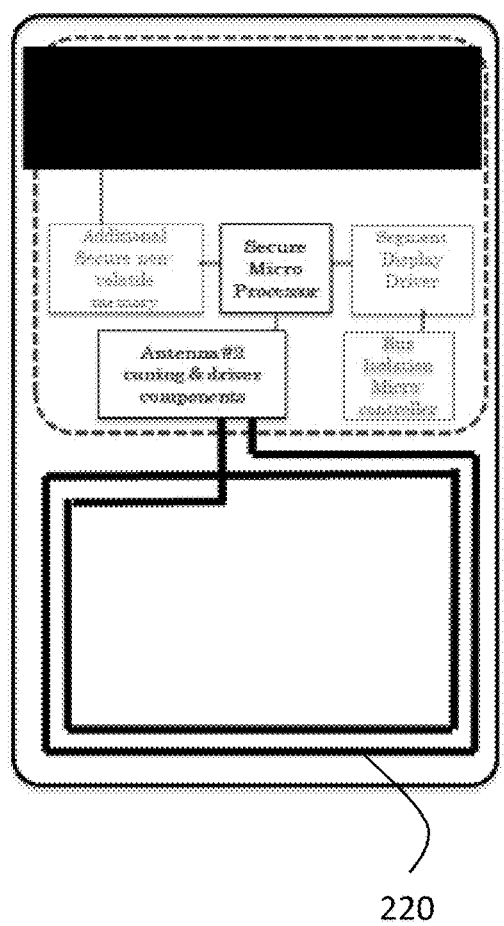
FIG. 3B
FIG. 3C

SYSTEM AND METHOD TRUSTED WORKSPACE IN COMMERCIAL MOBILE DEVICES

CROSS-REFERENCE TO RELATED APPLICATIONS

The present application claims the benefit of the filing date of U.S. Provisional Patent Application Ser. No. 62/556,302 filed by the present inventors on Sep. 8, 2017 and U.S. Provisional Patent Application Ser. No. 62/562,329 filed on Sep. 22, 2017.

The present application further is a continuation-in-part of U.S. patent application Ser. No. 15/730,929, which claims the benefit of the filing date of U.S. Provisional Patent Application Ser. No. 62/562,329 filed by the present inventors on Sep. 22, 2017.

The aforementioned provisional and non-provisional patent applications are hereby incorporated by reference in their entirety.

STATEMENT REGARDING FEDERALLY SPONSORED RESEARCH OR DEVELOPMENT

None.

BACKGROUND OF THE INVENTION

Field of the Invention

The present invention relates to a system and method for providing a trusted workspace in commercial mobile devices.

Brief Description of the Related Art

In many access control situations there can be overlapping credentials required to successfully access a particular asset. These can be described as Trusted Work Space Access requirements and in most chpervisorases they have to be exercised in the correct sequence.

An illustrative example is access to a locked closet in a locked home, two keys needed, one for the house, one for the closet. They have to be used in the right order to get at the contents of the closet. And if you also need access to a second closet you would need a third key. Another consideration here is who grants access, or who is the owner of the desired contents. In this case the owners of each of these keys can be different and they can have different requirements placed on the person privileged to use the key. For the first key, the key to the house, you might have to prove to the mortgage holder that you are the owner or have the owner's permission. If the second key is to an electrical closet you might have to prove that you are a qualified electrician to gain access and the third to the food pantry, with access only allowed for the cook. Another important consideration is that this second key is made available only to someone who has access to the house in the first place. This proves that the person has initially proven his identity. Hiding the second key in the house accomplishes this.

The point of this analogy is that access and authorization for this procedure can have many facets. It is called Trusted Work Space and requires a sequential control process to gain access to its inner contents.

The same needs hold true in accessing information systems, basic security clearances have to be proven (the first key) before access is given to special categories of information, or compartments (second/third keys). Basic security clearances are given after background checks by the governing body and compartment accesses are approved by the data owner, the "need to know" and the determination that accesses is required to perform one's job. Access records are kept securely and special responsibilities explained and accepted both when access is granted and when it is withdrawn. Management of these two levels of access also tend to be separate because of different ownerships. The rules would apply to physical as well as logical access.

SUMMARY OF THE INVENTION

A cryptographic module and mobile device can play an essential role in a wide variety of information access phases, in conjunction with its associated Smartphone, from the basic access procedures to the auditing of transactions. But there is an added hazard—that of keystroke recording malware. This is malicious software that has been introduced into the system without the owner's knowledge via various means, phishing and downloading from outlaw websites included, which will record any sensitive data entries. Once introduced into the system it would be capable of recording any subsequent password entry for later use. Passwords are particularly vulnerable because they can be used can be used for illegal entry at a later time. The concern is not total prevention of this introduction (very difficult if not impossible) but to ensure that this malware will not be able to record passwords that are used for special compartment access (the second key). In a preferred embodiment of the present invention, a cryptographic module and mobile device is used to perform a method capable of circumventing the recording of this second password entry.

The cryptographic module and smartphone and methods of the present invention circumvent vulnerabilities and protects a smartphone's or other mobile device's external wireless interfaces. Rather than replace a credit card with the smartphone or other mobile device, the security architecture of the present invention employs a token tethered to a smartphone or other mobile device through an NFC channel in the mobile device. The present invention is compliant with current ISO standard NFC protocols and technology and introduces a new class of security token referred to herein as a "cryptographic module," "Crypto Module" or "CM." The CM integrates two (2) NFC antennas to parasitically power the CM. However, during the power up sensing phase, the system disables one of the crypto module NFC data communication ports to thereby establish a single trusted and isolated I/O data channel between the mobile device and CM.

In a preferred embodiment, the present invention is a system and method for creating a trusted workspace on a commercial mobile device using a cryptographic security token having a secure microprocessor, a secure bus connected to said secure microprocessor, a bus isolation microcontroller connected to said secure bus wherein said bus isolation microcontroller comprises firmware for controlling communications through said secure bus to said secure microprocessor, a first NFC antenna connected to said bus isolation microcontroller, and a second NFC antenna connected to said secure microprocessor. The secure microprocessor and said bus isolation microprocessor are powered by energy received through said first NFC antenna and said second NFC antenna. The cryptographic security token receives data from outside said cryptographic security token only through said first NFC antenna. The token or module may further have a bi-state or bi-stable display and a secure memory, each connected to the secure microprocessor by a secure bus.

Essentially, implementing NFC in this unique configuration allows a separate hardware based crypto module to be securely linked to a commercial smartphone without embedding custom hardware. The smartphone/CM are paired to each other below the mobile device (smartphone) operating system via NFC. The smartphone/CM solution secures applications, protect sensitive user data, firewalls trusted workspaces, and isolates smartphone peripherals from unauthorized access and pernicious attacks.

In a preferred embodiment, the present invention is a system for overlaying security to the baseband NFC communication layers of the smartphone to establish a hardware-based root of trust or hardware trusted execution environment using the CM.

In a preferred embodiment, the present invention comprises a cryptographic security token having a secure microprocessor, a secure bus connected to said secure microprocessor, a bus isolation microcontroller connected to said secure bus wherein said bus isolation microcontroller comprises firmware for controlling communications through said secure bus to said secure microprocessor, a first NFC antenna connected to said bus isolation microcontroller, and a second NFC antenna connected to said secure microprocessor. The secure microprocessor and said bus isolation microprocessor are powered by energy received through said first NFC antenna and said second NFC antenna. The cryptographic security token receives data from outside said cryptographic security token only through said first NFC antenna.

The cryptographic security token may further comprise a bi-state or bi-stable display and a second secure bus between the display and the secure microprocessor. The second secure bus has fully programmable irreversible bit mapping of an order between a least significant bit and a most significant bit within a data address and provides unique data addressing of data being transmitted from the secure processor to the display. The irreversible bit mapping may comprise fusible links or means.

The cryptographic security token may further comprise a secure memory and another secure bus between the secure memory and the secure microprocessor, wherein the second secure bus has fully programmable irreversible bit mapping of an order between a least significant bit and a most significant bit within an data address and provides unique data addressing of data being transmitted from the secure processor to the display.

The cryptographic security token may further comprising energy harvesters connected to said first and said second NFC antennas.

The secure microprocessor, said secure bus, and said bus isolation microcontroller are formed on a thin film printed circuit board and may further comprise an epoxy-based conformal coating over said thin film printed circuit board. The conformal layer may have properties that block probing using X-rays, focused electron and ion beam scanning and scanning electron microscopy. In another embodiment, the conformal layer comprises a potting material comprising at least one material selected from the group of urethane, epoxy and ceramic; a compound mixed within said potting material; a mineral; and an anti-tamper film embedded within said potting material. The compound comprises one or more of metals, heavy metals, graphone, carbon, carbon fullerene structures, synthetic diamond dust and quantum dots. The anti-tamper film comprises an active or passive anti-tamper mesh film. In yet another embodiment, the conformal layer comprises an ultraviolet epoxy and a compound for preventing removal of the conformal layer with acid or etching techniques without damaging any portion of the underlying printed circuit board. The compound may comprise one or more shielding components selected from the group of ground metal compounds, graphene, carbon nanotubes, synthetic diamond and quantum dots.

The cryptographic security token may further comprise a UV cured adhesive material over said conformal coating. The cryptographic security token may further comprise a waterproof synthetic printing medium over said UV cured adhesive material, wherein polyolefin hydrophilic properties of the waterproof synthetic printing medium are custom infused with micro-taggants that fluoresce or leach die when probed.

The cryptographic security token may be the in the form of a card or in some other form.

In another embodiment, the cryptographic security token further comprises a voltage glitch detector for detecting power pulses in said security token. The voltage glitch detector comprises a comparator connected to a power bus in said cryptographic security token and to a reference voltage.

In yet another embodiment, the cryptographic security token may further comprise a secure memory; and an over/under temperature sensor and detector circuit for monitoring a temperature of said secure memory.

In a preferred embodiment, the present invention is a method for creating a trusted workspace on a mobile device using a cryptographic security token comprising a secure microprocessor, a secure bus connected to said secure microprocessor, a bus isolation microcontroller connected to said secure bus, said bus isolation microcontroller comprising firmware for controlling communications through said secure bus to said secure microprocessor, a first NFC antenna connected to said bus isolation microcontroller, and a second NFC antenna connected to said secure microprocessor, wherein said secure microprocessor and said bus isolation microprocessor are powered by energy received through said first NFC antenna and said second NFC antenna, and wherein said cryptographic security token receives data from outside said cryptographic security token only through said first NFC antenna. The method comprises the steps of provisioning the cryptographic module and the mobile device, initializing and booting up the cryptographic module and the mobile device; and transitioning the cryptographic module and the mobile device into the trusted work space. The provisioning of the cryptographic module comprises registering a user in the cryptographic module to establish the user's identity. creating authentication certificates associated with said user, loading private keys on to the cryptographic module and the mobile device. creating a first user password to enable access to a basic system on said mobile device and storing the first user password in the cryptographic module, creating a random password and loading said random password into a register on the cryptographic module, the random password only being accessible to the user through a secure display on the cryptographic module, and storing a low-level bootloader in the cryptographic module. The initializing and booting up of the cryptographic module comprises verifying the low-level bootloader with the cryptographic module, initiating, executing, and validating a secondary bootloader, verifying the operating system kernel wherein the verifying comprises verifying a large block of source code that bridges software and hardware in the mobile device, and verifying mandatory code signing for the operating system to applications in the mobile device. The transitioning the cryptographic module and the mobile device into the trusted work space comprises writing immutable data and code in separate memory containers within the cryptographic module as well as a split key to the mobile device.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which:

FIG. 3B is a block diagram of a front side of a cryptographic module in a card form in accordance with a preferred embodiment of the present invention.

FIG. 3C is a block diagram of an obverse or back side of a cryptographic module in a card form in accordance with a preferred embodiment of the present invention.

DETAILED DESCRIPTION OF THE PREFERRED EMBODIMENTS

Figure 1:
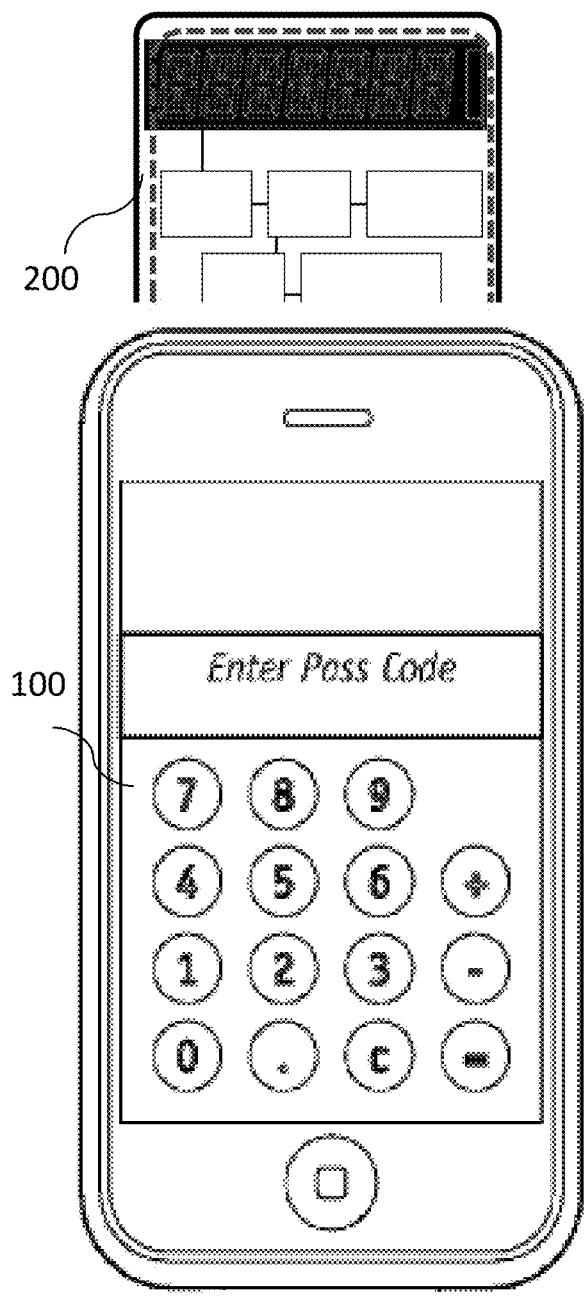
FIG. 1 is a front view of a cryptographic module and mobile device in accordance with a preferred embodiment of the present invention.

The preferred embodiments of the inventions are described with reference to the drawings. A typical operational configuration between a smartphone 100 and a crypto module 200 is shown in FIG. 1. Smartphone vendors embed the NFC antenna in various locations inside the back (non-metallic) cover. A simple sleeve is sometimes added to guide and align crypto module 200 inductive antenna coil with the smartphone antenna.

The present invention provides a localized security architecture for a smartphone based upon an NFC crypto module. The crypto module is the hardware trust anchor when connected to a smartphone. A layered approach is presented providing a defense-in-depth (DID) solution.

The software/firmware layered around the CM that address most threats and vulnerabilities is described with reference to FIG. 2. For clarity, we define the localized security ontology envisioned as a plurality of security layers. Each security layer encompasses one or more security attributes, services, or functions in the system. The layered design provides defense-in-depth protection even against National State level of attacks with knowledge and equipment resources.

Figure 2:
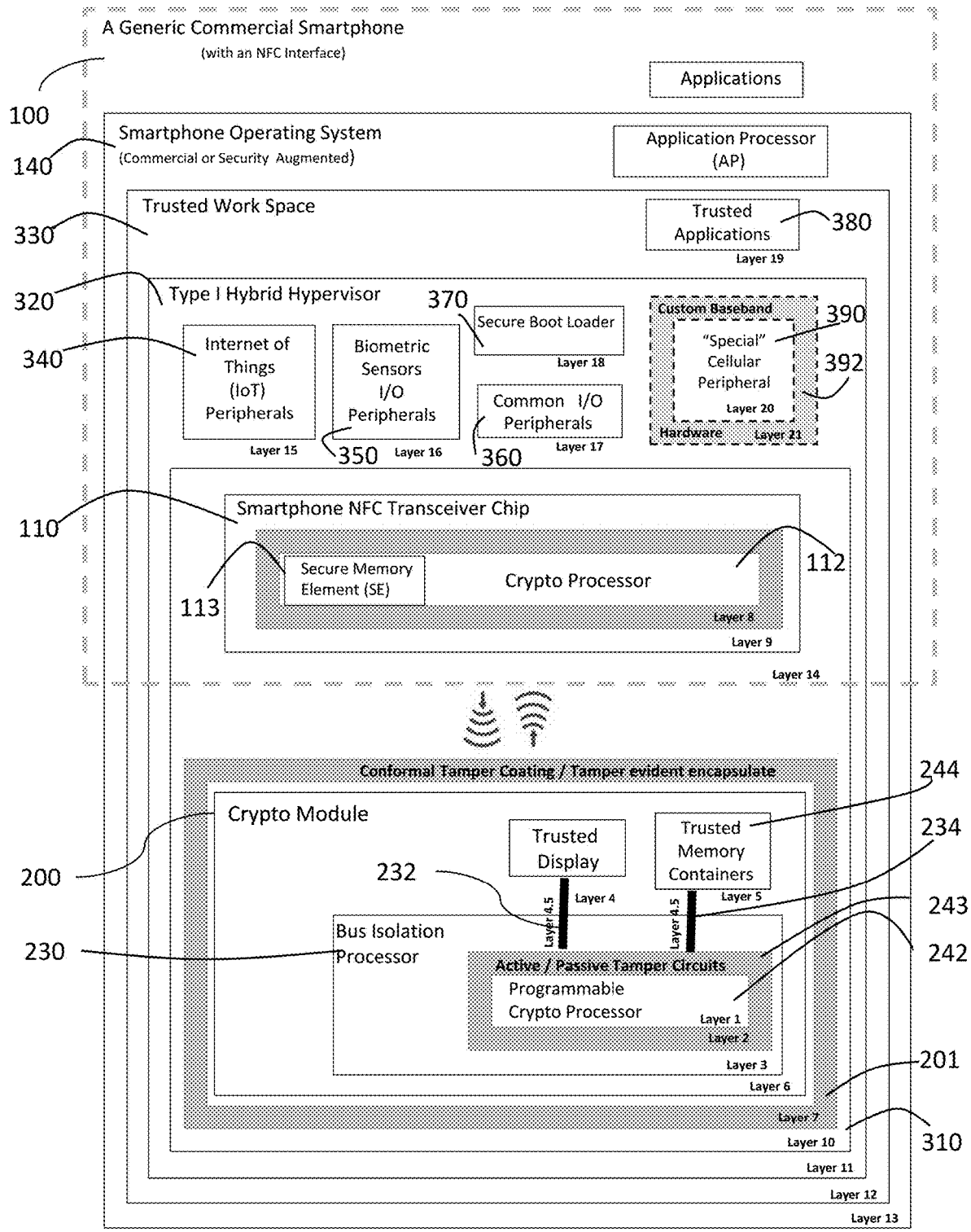
FIG. 2 is a diagram illustrating multiple layers of security provided by embodiments of the present invention.

FIG. 2 illustrates multiple layers of security:
Layer 1: The Programmable Crypto Processor (242);
Layer 2: Active/Passive Tamper Circuitry in the Crypto Processor IC (243);
Layer 3: Bus Isolation Processor (230);
Layer 4: Trusted CM Display (260);
Layer 4.5 Trusted buses (232, 243);
Layer 5: Trusted Memory Containers (244);
Layer 6: Crypto Module (200);
Layer 7: Anti Tamper/Tamper Evident CM Encapsulation (201);
Layer 8: Crypto Processor/Secure Element in Smartphone (112);
Layer 9: Smartphone NFC Transceiver Chip (110);
Layer 10: Encrypted NFC Channel (310);
Layer 11: Type 1 Hybrid Hypervisor (320);
Layer 12: Trusted Work Space (330);
Layer 13: Smartphone OS (140);
Layer 14 Commercial Smartphone (100);
Layer 15: Internet of Things (IoT) Peripherals (340);
Layer 16: Biometric Sensors I/O Peripherals (350);
Layer 17: Generic I/O Peripherals (360);
Layer 18: Secure Boot Loader (370);
Layer 19: Trusted Applications (380); and
Layers 20-21: Custom Baseband Cellular Peripheral (390, 392).

The present invention relates specifically to the cryptographic module or token and thus to specific ones of these layers of security, more specifically, Layer 1 (The Programmable Crypto Processor), Layer 2 (Active/Passive Tamper Circuitry in the Crypto Processor IC; Layer 3 (Bus Isolation Microprocessor); Layer 4 (Trusted CM Display); Layer 4.5 (Trusted Buses), Layer 6 (Crypto Module) and Layer 7 (Anti Tamper. Tamper Evident CM Encapsulation).

Layer 1: the Programmable Crypto Processor

The fully programmable cryptographic processor (242) is a separate integrated circuit (IC) within the CM. This chip 242 executes all the most trusted cryptographic functions. With an embedded general-purpose 8051 microprocessors, it also integrates three (3) math co-processors for single command execution of Elliptic Curves, AES, and 3DES algorithms. The crypto processor includes over 100 layers of security.

Layer 2: Active/Passive Tamper Circuitry of the Crypto Processor Chip

As described in Table 1, the crypto processor chip 242 has both active, passive, and design layout features that protect the functions and data contents of the cryptographic processor chip. Active tamper sensors in the CM are only powered when the CM is powered by the smartphone. When power is removed from the CM the crypto processor sensitive data stored within volatile memory is removed through known means for wiping data in volatile memory.

Layer 3: Bus Isolation Processor

The primary function of employing a separate bus processor 230 embedded within the CM is to isolate and secure the internal bus from outside access from intentional intrusion. The security functionality of the Bus Isolation processor chip 230 is detailed in the next two sections. It is an important function to switch the NFC bus control from the smartphone to the CM and to physically isolate the vulnerable data bus within the CM from access by the smartphone and outside world.

Layer 4: Trusted CM Display

The crypto module has been designed with its own separate secure display 260, referred to herein as a "trusted display." It is typical of most secure CM operations that eight or more individual security functions (i.e. unlocking a trusted smartphone app) are executed in series. Consequently, status, intermediate results, alerts, interrupts, and prompts all are displayed on the trusted CM display.

Not only does the trusted display 260 provide user feedback while secure processes are being executed but also it provides instant notices if any attacks or policy breaches occur. For example, if a data breach attempt by a hacker occurs in the hardware/firmware of the crypto module, the display will automatically generate a message. The crypto module can actively respond to a data breach by terminating all trusted processes, make sure that any unprotected private data is encrypted and stored, erase unprotected keys, and block any further requests for trusted processes. In essence, the trusted display provides feedback to the user of a tamper event.

A second value of the trusted display 260 is the ability to confirm a trusted CM operation was completed—meaning the CM is capable of performing atomic operations, i.e., a single function at one instance in time with no other software thread running such that no other temporary registers are being used by other functions and the heap and stack registers (which keep track of the jumping pointers) are only being accessed that that single function. In other words, during the process the trusted display is designated to show just the intermediate results and no other application can interrupt. With the trusted CM display 260 any given cryptographic operation is guaranteed to run to completion and the intermediate results of a primitive operation cannot be modified.

The main security advantage of the bi-stable display technology is that once the elecrophoretic pixels are changed, they remain in this position and the contents created on the display remain in place without any external power supply (i.e. the smartphone). At the same time, visible information on the trusted display 260 can neither be deleted nor manipulated from outside. Additional power is only needed to write new display contents and this is only possible through commands from the crypto processor within the CM.

Another unique security advantage of the bi-stable segmented trusted display 260 on the crypto module 200 is the capability to eliminate or replace the need to print the user's name, role, card expiration data, and even photo on the outside of the card. Removing sensitive printed data on the card and storing it electronically inside the CM 200 makes it significantly more challenging for an adversary to counterfeit the CM.

Furthermore, the user's electronically stored role, access privileges, and time-bounded access information can be scrolled on the segmented display to provide the verifier more granular data. Scrolling data on the segmented CM display 260 can provide any type of more detailed sensitive user data without exposing the data by printing it on the card. This type of data includes, social security number, date of birth, blood type, rank in military, country of citizenship provide, immunizations, special access privileges, vehicle registration, and more.

Another unique security advantage of the bi-state segmented trusted display 260 on the CM 200 is to show the specific photo files decrypted and forwarded to the smartphone verifier. In this use case, a file containing a sequence of portraits of the CM owner at various angles, or even video scenes can be forwarded to the verifier's smartphone device. This "video Identification on card" technology means that no sensitive biometric data has to be transferred to an external document verification device without that entity being approved by the CM owner.

Yet another feature of the CM display 260 is for use in eID applications. One-Time-Passwords (OTP) can improve the security of transaction-based on-line sessions. CM display 260 can facilitate a Secure Password Protected Authentication Channel (SPAC). The use of an optical channel implemented by a flexible display for secure password transmission in combination with a cryptographic procedure is now feasible. The CM trusted display 260 in this use-case acts as security-enforcement component to establish secure and authenticated radio frequency communications between the NFC CM and smartphone.

Layer 4.5: Customized Data Bus Between Crypto Processor and Trusted Display/Memory In FIGS. 2 and 3A another security feature of the crypto module is a custom data bus between the cryptographic processor (242) and trusted memory (232) and trusted display (234). Sensitive data is transferred between these components on the Printed Circuit Board (PCB) that are potentially vulnerable to probing attacks. Probing can be either physical using microprobes or with non-intrusive imaging tools such as X-Ray/Terahertz microscopy, SIM, or ion and electron beam equipment.

Countermeasures to protect these two data bus on the PCB include the Conformal Tamper coating detailed in Layer 7 (201). In addition, these two data busses (232, 234) are customized using three (3) novel techniques.

First, the buses between the trusted memory (234) chip/trusted display (234) driver chip and the secure cryptographic microprocessor chip (242) is fully programmable to bit mapping of an order between a least significant bit and a most significant bit. This is a one-time, irreversible, and unique for each crypto module. The advantage of uniquely customizing the order of each data bit to each crypto module (200), requires the hacker to expend significantly more time is to to probe and extract meaningful data. Moreover, automated software tools cannot be employed.

Second, all circuitry used to transmit data across the bus employs complimentary logic using a redundant 2-wire (dual rail) design. The purpose of this design reduces the small variations and glitches induced on the supply power supplies when transmitting the data. Obfuscation of the transmitted data makes it significantly more challenging for an adversary to identify and extract data being transmitted between integrated circuit components. This defensive technology uses self-timed dual-rail logic. In dual-rail logic, a '0' or '1' is signaled not by a low or high voltage on a single wire, but by a combination of signals on a pair of wires. For example, '0' may be 'LH' and '1' may be 'HL'. When used in self-timed circuits, 'LL' signals quiescence. Another advantage of dual-rail encoding is reduced data dependent power consumption as all states have the same Hamming weight. Dual-rail encoding is not sufficient to guarantee a data independent power signature. The path taken by each wire could vary resulting in different wire load. Yet another attribute of the dual rail bus design is to allow reliable propagation of the tamper alarm signal from tamper film of Layer 7 (201) to the crypto processor (242).

Third, the custom data buses (232, 234) also integrate a check sum or error correction circuitry on the dual-rail design. If data errors are serendipitously injected into the bus by a hacker, the check sum logic can detect and self-correct these injected bits. An inherent drawback of the dual rail design is fragility: bugs tend to cause the emergence of the unwanted 'HH' state, which propagates rapidly throughout the circuit and locks it. Implementation of the customized check sum/error correction circuitry reduces the sensitivity that single data bit failure is likely to cause the output of sensitive information.

Layer 6: Crypto Module

The fundamental role of the CM 200 is to provide an independent isolation trusted processing environment outside the smartphone. The CM 200 achieves this in two ways. First, the hardware design prevents access to or monitoring of the internal operations of both token and smartphone. Second, the CM secure cryptographic functions executed within the CM never expose or exports critical data like private keys, user authentication data, trusted processing results, or other like data.

The crypto module 200 defines a standardized isolation environment linked to a commercial smartphone in which security software/firmware code, data and resources are processed outside from the main operating environment, software, and memory in the smartphone.

The security functionality of the crypto module is detailed below.

Layer 7: Anti Tamper/Tamper Evident CM Encapsulation

Because the crypto module 200 is a system comprised of many chips and a display, the encapsulation material around the CM is protected against tampering. Most vulnerable to attack are physical probing or indirect probing to extract data off the internal data busses, memory, or IC's.

Anti-tamper technologies to protecting a single integrated circuit to withstand multi-million-dollar attacks have evolved to protect intellectual property and reduce the potential attack surface. Many chips now implement non-standard attack-resistant logic styles, protective mesh layers, passive tamper resistive tamper evident, and active attack sensors. An effective anti-tamper solution encapsulating the entire printed circuit board (PCB) has not emerged against non-invasive and semi-invasive analysis techniques. The layer 7 encapsulation provides the structure and method for this method.

The most effective way to secure the CM 200 is to include multiple levels of security features to each encapsulation layer. The crypto module encapsulation layers include a conforming anti-tamper potting material, UV cured binding adhesive, and Teslin with extruded tamper taggants, customized covert and/or forensic security inks, and polyester top lamination. Each lamination layer incorporate one or more anti-tamper security features.

The first layer of tamper protection on the CM is a conformal tamper thin film coating printed over the front and obverse sides of the Printed Circuit Board (PCB) using UV/Visible light to help streamline the curing processing. The objective of the conformal coating is to achieve a higher anti-tamper (AT) level of protection without compromising circuit performance. The use of AT technologies prevents or slows an adversary's attacks by increasing the time it takes for them to reverse engineer and design a counter to the system.

The first tamper layer is a hard opaque potting material encapsulation of multiple chip circuitry CM or strong opaque on front and obverse side of the PCB with removal/penetration attempts causing serious damage.

The first encapsulation tamper layer base is comprised from urethane (provides a hard, durable potting coating that offers excellent abrasion and solvent resistance), epoxy (excellent resistance to moisture and solvents, consisting of a two-part thermosetting resin), or ceramics (thermal spray that shields direct access to PCB). It is opaque and resists solvents, heat, grinding, and other techniques that have been developed for reverse engineering.

Other tamper compounds are mixed within the base material to protect against micro-probing attacks. Compounds mixed within the base urethane, epoxy, or ceramic potting material are design to not only shield electromagnetic emissions but also block outside electromagnetic micro-probing. These compounds can etch or automatically destroy the underlying components on the crypto module circuitry when an attempt is made chemically to break through the protective layer.

Various compounds mixed within the opaque potting material are specifically designed to shield against different types and instruments used in probing attacks. These compound materials and esoteric combination of materials include;

ground metal compounds—reduced the effectiveness of remotely resetting/setting security fuses or memory by UV light or visible light. These metal compounds mixed with the potting material effectively shield attacks from Voltage contrast Scanning Electronic Microscopy tools.

Graphene—has extraordinary properties as an electronic conductor, thus greatly reducing the effectiveness of probing with electron ion beam and Focused Ion Beam (FIB) probes.

Carbon nanotubes, Carbon allotropes, carbon buckypaper film, and carbon fullerene structures include other spherical, ellipsoidal and tubular shapes, all of which capture and electrons from the focused electron and ion beam utilization tools.

Synthetic Diamond in ground or sheet form which shield electrons from penetrating while providing a hard mechanical substrate which destroys underlying CM circuitry when potting material is chemically removed. Synthetic diamond can also help shield from tools such as Focused Ion Beam machines that can ballistically, dislodge, or sputter electrons on the surface of IC substrate.

Quantum dots are minute semiconductor crystals that favorably change the optical properties that are governed by the size. The size alone of the crystal fine-tune the photon absorption or emission spectra without requiring a complicated change of material composition or stoichiometry. This becomes important shifting (stoichiometry) frequency of probes used to exact data like x-ray, laser voltage, Scanning Electronic Microscope (SEM), and UV scanning machines to the light frequencies that the on-chip silicon light sensors can detect and match the bandgap of silicon.

A tamper mesh acts as a continuously powered sensor in which all the paths are continuously monitored for interruptions and short-circuit. For the multichip crypto module PCB, the mesh covers all the sensitive components of the crypto module object and the data busses. The active tamper detection hardware circuitry is located within the cryptographic processor (242).

The tamper mesh film is the only active tamper element of the Conformal Tamper Coating/Tamper evident encapsulate (201). Since there is no internal battery embedded with to the crypto module, tamper detection is only active when the CM is powered parasitically by the smartphone. However, when combined with the passive potting material infused with other compounds, the conformal coating achieves significant countermeasures to attacks and probing.

This described security layer extends the protective boundary from the cryptographic processor anti-tamper layer (243) to the entire thin film cryptographic module (201). Extending the tamper boundary provides robust protection to the data buses (232, 234) connecting the chips within the crypto module.

The tamper mesh film embedded within the potting material of the conformal tamper coating integrates electronic sensing and detectors that are processed with circuitry inside the crypto processor (242). The type of sensors include:

Continuity Mesh Sensor—a mesh of thin conductive traces in the film provide anti-probing barrier to the crypto module. When the mechanical probe penetrates through the mesh, a conductive trace is broken which the detection circuitry can detect a continuity change.

Power—Glitch Sensor and/or internal clock Manipulation—Fast signals of various kinds may reset data or cause program being executed within the cryptographic processors to jump or skip instructions if the power glitches are applied at the precise time. The program counter is already incremented automatically during every instruction cycle and used to read the next address, which makes it an ideal vector of attack if the adversary can generate a condition to change the counter externally by applying a short high voltage or current spike. The power glitch sensor and circuitry protects against these attacks.

Under voltage/Over voltage Sensors—Non-invasive attacks include playing around supply voltage and clock signal. Under-Voltage and Over-Voltage attacks could be used to disable protection circuit or force the processors to do wrong operation. For these reasons, voltage detection circuit is needed to prevent nefarious manipulation of data within the crypto module.

Anti SPA & DPA Sensor and Circuitry—Simple Power Analysis (SPA) and Differential Power Analysis (DPA) are attacks which extract data from probing the power supplies of the target circuitry. They measure the small variations in current and voltage coupled these DC supplies signals. The minute capacitance and resistance generated by the switching logic have been observed and correlated to sensitive data being executed within chips and transferred between chips. One of the more susceptible components within the crypto module is the data buses between the crypto processor and trusted display/memory. Drivers on the address and data bus often consist of up to a dozen parallel inverters per bit, each driving a large capacitive load. They cause a significant power-supply short circuit during any transition. Changing a single bus line from 0 to 1 or vice versa can contribute in the order of 0.5-1 mA to the total current at the right time after the clock edge, such that a 12-bit ADC is sufficient to estimate the number of bus bits that change at a time. The RF power coupling, the internal voltage regulators, and the conformal coating prevent access to the power supplies needed for SPA and DPA attacks.

Light Sensor—Many non-evasive machines like x-ray, scanning electron microscopy, and focused electron and ion beam utilization use wavelengths of light similar to a silicon detector. Placing these sensors within the conformal layer in combination with some heavy metal elements like neodymium (a soft silvery metal) provides the ability to stop the higher x-ray frequencies at the same time converting to lower frequency ions that are detectable by the silicon sensor. A simple low cost silicon light sensor combine with the proper compounds can detect and prevent attacks from advanced circuit imaging equipment.

Temperature Sensors—There are several attacks that a hacker externally and non-evasively chills the circuit forcing small charges that define and retain the value of a memory cell even when power is removed. A temperature sensor in the conformal tamper coating (201) processed within the crypto processor (242) counters this attack. Cooling memory to extract data is called data remanence. This is the capability of volatile memory to retain information stored in it for some period of time after power was disconnected. Static RAM contained the same key for a long period of time could reveal it on next power on. Other possible way is to 'freeze' state of the memory cell by applying low temperature to the device. In this case static RAM could retain information for several minutes at −20° C. or even hours at lower temperature.

The encapsulation layer (201) provides detection of direct mechanical and electronic probing activities that are intended to extract the data within the CM. The conformal tamper coating provides resistance from attacks using, x-ray, scanning electron microscopy, and focused electron and ion beam utilization. In addition, this tamper layer also provides indirect reverse engineering attacks. An example is a simple power analysis; in which a device's low-level self-radiated energy is sensed and analyzed, thus giving insight to the operation of that electronic component. The conformal coating will block this type of attack.

The core card body of the CM also employs multi-layered composite of materials and techniques to deliver greater security and functionality. This core card body material being made from a synthetic material called Teslin™. Robust anti-counterfeit, tamper-evident properties of Teslin are provided by polyolefin hydrophilic properties of the material that are custom infused with micro-taggants that fluoresce or leach die when probed. The lamination layers are designed such that physical tamper resistive layers will destroy the circuitry if removed.

Combined the covert features embedded into lamination substrate, the core card body can be verified through quick visual inspection using simple equipment such as ultraviolet (UV) flashlights and infrared (IR) pens if any tamper has occurred. The UV taggants are easily distinguished as a unique optical "fingerprint," and because they are easily discernable on the edge of a card. IR tangents provide additional authentication options with enhanced readers. Embedded UV and IR security markers cannot be replicated by copy machines or print processes.

The System Environment

Figure 3A:
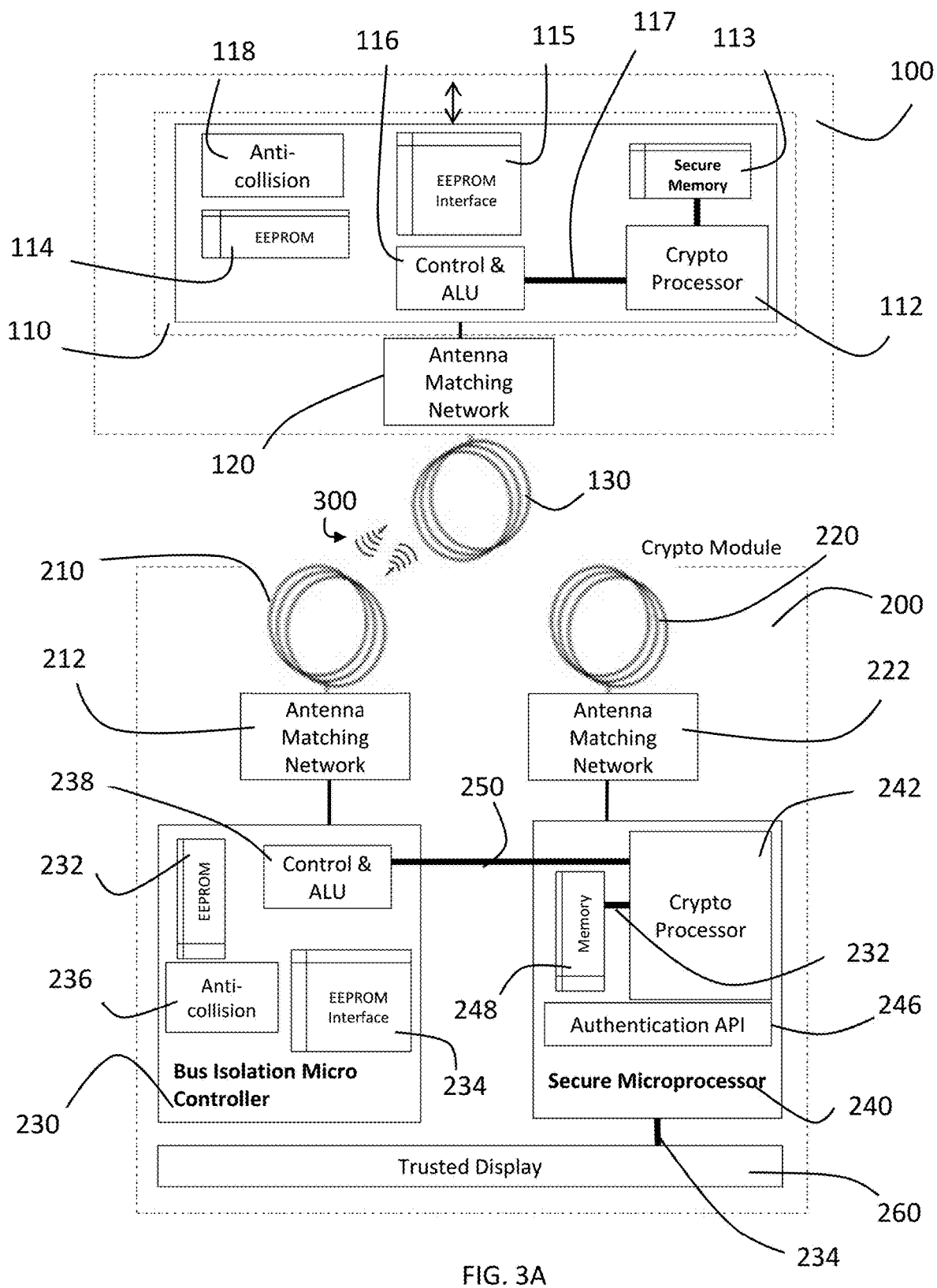
FIG. 3A is a block diagram of a system having a cryptographic module and a mobile device in accordance with a preferred embodiment of the present invention.

As shown in FIG. 3A, the present invention provides a cryptographic module or Crypto Module 200 for use with a commercial smartphone over the NFC channel in the smartphone. The Crypto Module includes a separate cryptographic processor 242 in the crypto module 200 that is complimentary and compatible with the smartphone cryptographic processor 112. The CM cryptographic processor 242 integrates a programmable cryptographic library of algorithms.

In addition, most vendors NFC transceiver chips incorporate both a programmable hardware processor 116 and secured memory 113. The secured memory 113 can store symmetric or asymmetric cryptographic keys for the NFC channel encryption or sensitive user data like credit card data, public key splits, or other sensitive user data.

Encapsulated messages between the Crypto Module and smartphone are encrypted so that even if intercepted, no content can be extracted. The standard NFC message encapsulation format for information exchange is NFC Data Exchange Format or NDEF. It is a binary message format for exchange of application payloads of any type and size within a single message. A type, a length, an optional identifier, describes a payload. Possible types are URIs, MIME media types and NFC-specific types. The optional identifier may be used to handle multiple payloads, and cross-reference between them. Payloads may include nested messages or chains of linked chunks with unknown length at the time the data is generated. NDEF is only a message format and keeps no knowledge of connections or logical circuits.

As shown in FIG. 3A, a commercially available mobile device 100 such as a cell phone typically will have an NFC baseband chip 110 having a cryptographic or secure processor 112, a secure memory 113, an EEPROM 114, an EEPROM interface 115, control and ALU processor 116, anti-collision firmware 118 and a bus 117 that provides communications between the cryptographic processor 112 and the Control and ALU 116. The mobile device 100 further has an antenna matching network 120 and an antenna 130.

A cryptographic module 200 in accordance with the present invention has a first NFC antenna 210 with an associated antenna matching network 212, a second NFC antenna 220 with an associated antenna matching network 222. The Crypto Module 200 further has a bus isolation microcontroller 230 having an EEPROM 232, an EEPROM interface 234, anti-collision firmware 236, Control and ALU processor 238 and Authentication application interface (API) 146. The Crypto Module 200 further has a secure microprocessor 240 having a cryptographic processor 242, authentication firmware and hardware 246 within the crypto processor 242 and EEPROM 248. A bus 250 provides for communications between the bus isolation microcontroller 230 and the secure processor 240. The Crypto Module 200 further includes trusted display 260.

Leveraging the hardware encryption processor 112 incorporated in the commercial smartphone transceiver chip, the crypto module architecture integrates a compatible hardware cryptographic processor 242 in the design. Shared symmetric cryptographic AES or equivalent keys are pre-stored during provisioning of the smartphone 100 and CM 200 respectively. The cryptographic key for the smartphone 100 is stored in trusted memory 113 and sometimes called the "secure element." An expandable memory (not shown) in the crypto module 200 as well as the integrated memory within the crypto processor 242 is trusted and secure. The Crypto Module memory can be parsed into separate trusted data containers during provisioning for multiple trusted applications. For example, a separate memory container can be provisioned in the crypto module to store the NFC data channel encryption key.

Utilizing the existing NFC hardware in the smartphone 100, the data traveling between the smartphone 200 on a data bus 117, through the air gap of the NFC, through the data bus 250 in the Bus Isolation Microcontroller 230, and finally to the secure processor 242 is fully bi-directional encrypted. Data in transit within the crypto module 200 is decrypted and protected by other layers of defense, for example, in the Crypto Module circuitry 260. By integrating a common security NFC protocol and compatible hardware cryptographic processors on each end of the data channel, a more effective and secure framework is provided for implementing a suite of new security functions.

Power-Up Mode

The Crypto Module 200 is designed as a hybrid device meaning it is a passive token in that it does not have a battery, yet it immediately establishes bus control upon sensing the NFC field from the active (powered) smartphone 100. The smartphone antenna design with a large (2500-4500 mamp/hour) battery typically amplifies the signal to the receiver—the crypto module. Although the minimum or maximum power value actually transmitted to the crypto module is NOT defined in the NFC standard.

The communication technology is based on magnetic field induction from an active (battery powered) device like a smartphone. A passive device like the CM 100 does not contain a battery, but rather, is parasitically powered by an induced magnetic field of the smartphone. A typical passive token is powered up when the magnetic field is strong enough to induce the needed voltage in the passive token's antenna so that its internal circuitry can operate. In this scenario, the typically passive token responds and defaults as the passive device. When activated, the typical passive token simply responds to commands sent by the active initiating device (smartphone).

The novel architecture of the present invention employs a hybrid NFC interaction between the active smartphone 100 and passive CM device 200. However, the crypto module 200 does NOT default as the passive device as a responder to the initiating smartphone 100. Rather, when sensing the induced NFC field, firmware within the CM 200 switches control of the data interface from the smartphone 100 to the CM 200. With this new hybrid NFC protocol architecture, all actions like authentication or transmitting the contents stored in memory are initialized and controlled by the crypto module 200 not the smartphone 100.

Essentially, the control of the NFC data bus is switched from the smartphone 100 to the crypto module 200. The crypto module 200, even though it's being parasitically powered by the smartphone 100, is an independent entity capable of executing one or more trusted processes.

To effectively switch the control of the NFC bus from the default smartphone 100 (that is powered) to the Crypto Module 200, two NFC antennas 210, 220 are implemented in the Crypto Module 200.

The basic Crypto Module antenna design is a square loop with approximately 3 cm sides, rounded corners and 9 turns. Layout of the metal traces and geometry comprising the CM antennas is straightforward, as they only support passive communication mode (i.e. they do not have to generate their own magnetic field like the smartphone). The present invention, however, is not limited to this antenna architecture.

The analog tuning antenna circuitry in the antenna matching networks 212, 222 does require careful tuning using discrete components to calibrate and optimize the Q-factor, the resonance frequency tuned near the 13.56 MHz carrier frequencies, and to pre-shift the carrier frequency for the materials used to encapsulate the crypto module 200 into the card form factor.

The two antenna design for the crypto module 200 is functionally unique for two reasons. First, the inductive power coupling mechanisms from the smartphone 100 to the Crypto Module 200 is more efficient when using two antennas. This is based on the resonant frequency, the number of turns and the effective area. Although providing a better Q-factor, the number of turns cannot be infinitely increased. Integrating a second antenna 220 on the opposite (obverse) side of the Printed Circuit Board side (FIG. 3B) with an identical antenna 210 on the front side is effectively coupling in more power. Antenna #1 (210) and Antenna #2 (220) couple power into the Crypto Module 200 using analog circuitry in the antenna matching networks 212, 222. Placing, metal components, signal traces, or ground planes outside the two-antenna coil loops optimize the induced magnetic field power coupling further.

Tin the Crypto Module 200 power is needed to supply the bi-state display 260, display driver Integrated Circuit 204, cryptographic microprocessor 242, bus controller processor 230, analog antenna tuning and filter circuitry 212, 222, and non-volatile memory. With a maximum of 10 mamps available from the smartphone NFC antenna, a multiple antenna design on the CM side is capable of coupling in enough power.

Second, the two-antenna Crypto Module design improves security. The design provides a means to truly isolate the data and power between the smartphone 100 and a Trusted Execution Environment (TEE) required for the crypto module 200.

This TEE isolation is achieved by a novel method of using both NFC antennas 210, 220 during the initial power up sequence of the Crypto Module 200, followed by assigning the NFC data bus to antenna 210 exclusively. A separate microcontroller 230—called the "Bus Isolation Processor" or "Bus Isolation Microcontroller" is included in the Crypto Module 200 to provide physical and temporal isolation.

Figure 4:
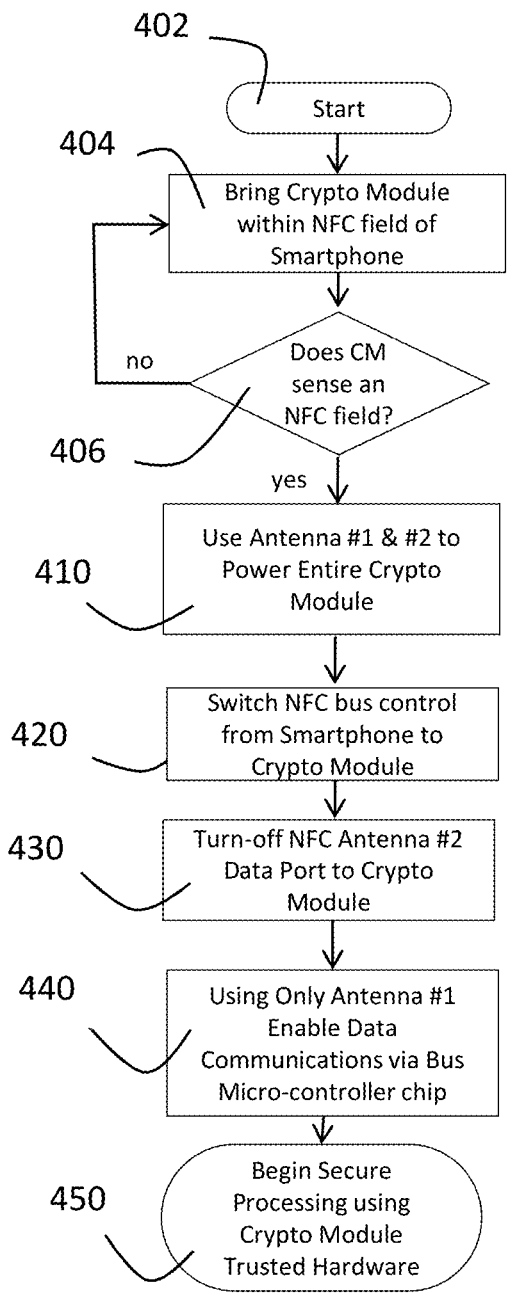
FIG. 4 is a flow chart of a power up sequence of a cryptographic module in accordance with a preferred embodiment of the present invention.

The flow diagram in FIG. 4 details the sequence of steps that isolate the Crypto Module 200 during power up. The Crypto Module 200 is powered 100% parasitically by the smartphone 100. The NFC standard assumes Reader/Writer NFC operational mode. The smartphone 100 is the active reader device since it has a battery. Likewise, in Reader/Writer mode, the crypto module 200 defaults (as defined in the ISO standard) as the passive device responding to the smartphone. Even though the NFC standard was later appended with ISO 18292, including tokens that could be internally powered, the firmware programmed into the Bus Isolation Microcontroller 230 chips will still set the CM as the Master bus device. Therefore, the flow diagram isolating the internal TEE Crypto Module data bus is still applicable. A flow diagram later in this application describes how the same security architecture works for any mode of the NFC standard.

The process begins (402) when the user brings the Crypto Module within approximately 1 cm of the smartphone (404). When the user brings the Crypto Module within approximately 1 inch to the smartphone, both the internal cryptographic processor and bus isolation processor sense an RF field (406). The Bus Isolation processor powers up faster than the cryptographic processor thus it is the first to sense any commands sent from the smartphone NFC transceiver.

Both Antenna #1 and #2 couple power to the crypto module (410). Once fully powered (420), the Bus Isolation Processor ignores the smartphone's initiator request and sends an initiator return ping request to the smartphone. The reason why the Bus Isolation Processor ignores the smartphone request is so that the CM can be established as the active or master device on the NFC bus. An acknowledge response is received back from the smartphone (thanks to the added active card ISO 18292 standard addition) and it immediately turns off the NFC data port from the second antenna to the crypto processor (430).

Note, by disabling the Crypto Module data port in NFC antenna #2 (230), it does not disable the carrier frequency of antenna #2. At this point in the process the Crypto Module is inductively powered by both Antennas #1 and #2 (410), yet the only data communications link between the smartphone and Crypto Module is through Antenna #1 (440). This subtle yet obscure sequence of steps that are fully compliant with the NFC standard. These steps allow a passive card like the CM to be parasitically powered while at the same time allowing the CM to be the master data bus controller and thereby become trusted hardware for secure processing (450).

Figure 5:
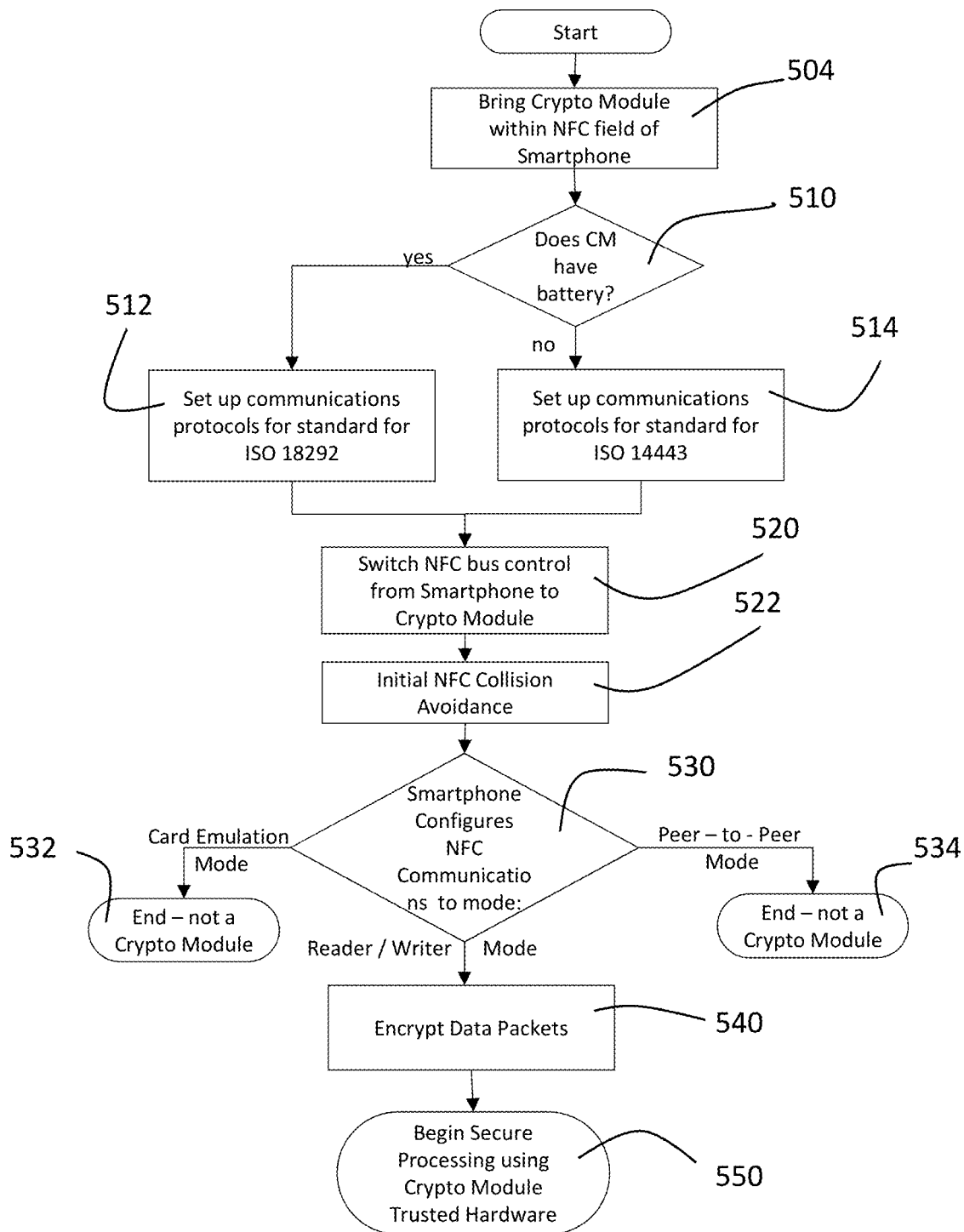
FIG. 5 is a flow chart of a method for establishing secure processing using cryptographic module trusted hardware in accordance with a preferred embodiment of the present invention.
Figure 6:
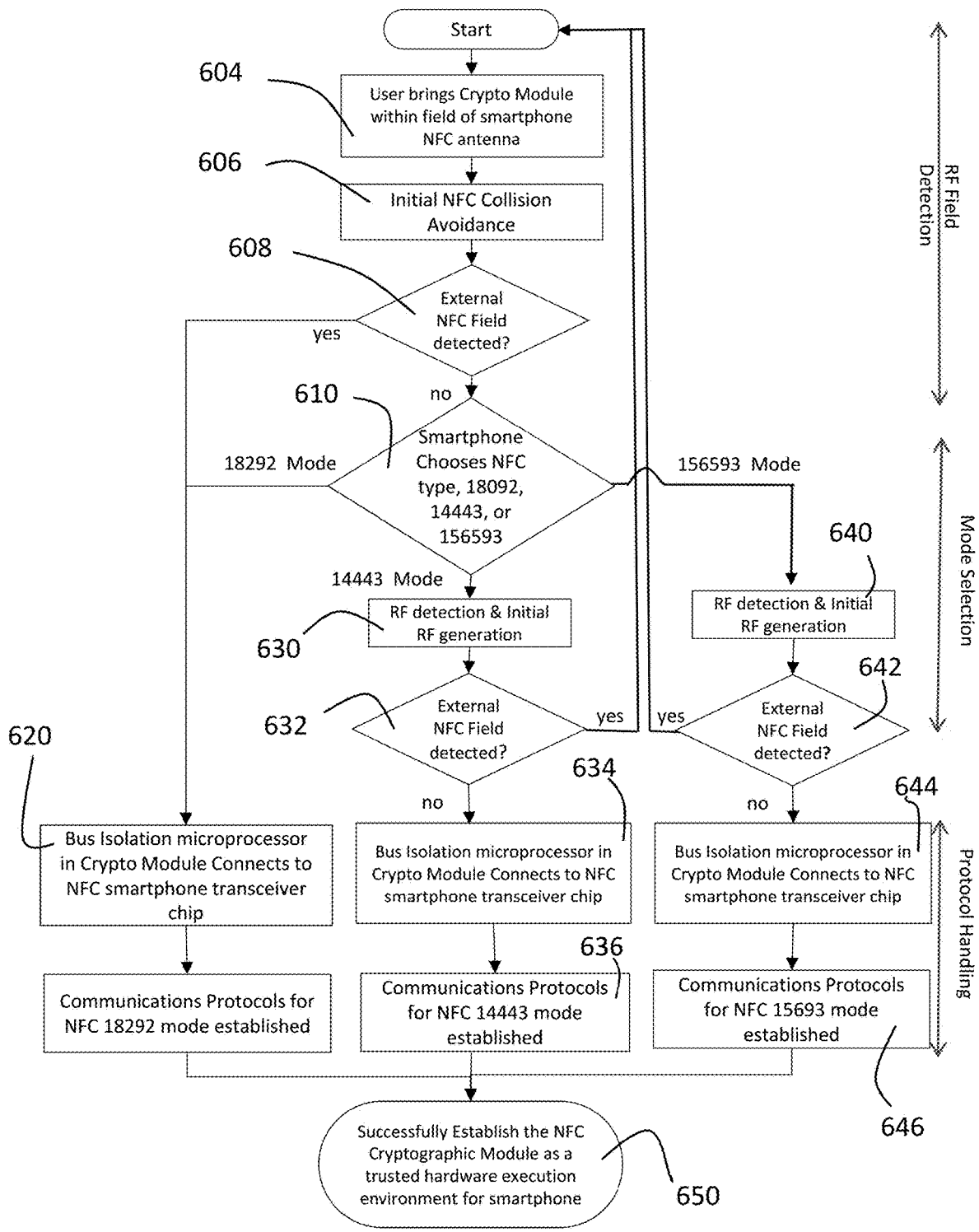
FIG. 6 is a flow chart of a method for establishing an NFC cryptographic module as a trusted hardware execution environment for a mobile device in accordance with a preferred embodiment of the present invention.

ISO NFC standards have defined three (3) different communications modes. From the smartphone perspective, with the exception of steps 510, 520, 540 and 550 shown in FIG. 5, the power and configuration settings of the NFC connection follow the standard.

The first mode is peer-to-peer. In peer-to-peer mode, two NFC devices (i.e. smartphone #1 & smartphone #2) can exchange data such as virtual business cards. When the CM is brought within range of the smartphone (504), the NFC protocol will determine whether the CM is a batteryless token (510). Depending on whether the token is batteryless, the smartphone sets up communications under a correct ISO (512 or 514) and switch the bus control to the CM (520) and performs initial NFC collision avoidance (522). However, when the smartphone protocol attempts to configure the data channel (530) it will realize that it's in Peer-to-peer mode and terminate the communication exchange (534).

In the $2^{nd}$ mode—Card Emulation mode, data such as credit card or transit data is stored within the active powered smartphone device whereby the user's phone replaces the card itself. Following the standard NFC powering up sequence (504), the smartphone will realize that the CM does not have a battery (510), attempt to switch control to the CM (520), and configure the CM/smartphone into the Card Emulation mode (530). However, no data will be transferred from the CM to the smartphone and an end of operations command is issued (532).

The $3^{rd}$ NFC communication mode is called Reader/Write. The method of the present invention operates in the Reader/Writer mode. The Reader/Writer operational mode has duplex two-way communications and allows for battery powered or passive tokens. Following the NFC standard during the power up mode, the CM can have a battery as defined in ISO 18292 or be a passive token without a battery like ISO standard 14443. In either battery or batteryless CM case, the Crypto Module assumes control over the data bus (520). Upon completion, the data bus encrypts the channel in both directions using a pre-stored symmetric key (540). The crypto module is now securely tethered to the smartphone to proceed with any requested secure processing (550). The smartphone utilized a single NFC chip to and are fully compatible with all three communications modes.

Because of the relatively short communication range in NFC in general, little effort has traditionally been put into security analysis of such protocols. It seems that the short signal range leads people to believe that the channel cannot be tampered with. Although inherently more difficult to eavesdrop on an NFC mode compared to other smartphone interfaces, the present invention focusses on only adding security to the NFC data channel.

The NFC standard defines two modes of operation, active and passive. In passive mode the initiator generates a RF field to energize the target. In turn the target responds using a load modulation scheme on the field generated by the initiator.

In the typical card-reader smartphone NFC application, the smartphone is the active/initiator and the token is the responder or passive device powered up parasitically by the smartphone. In active mode each device generates its own RF field and modulation. The initiator sends information or commands on its field, and the responder answers on another field.

With security architecture and method of the present invention, these active/passive roles are switched between the smartphone and Cryptographic Module—without modifications of the standard NFC protocol. As the Crypto Module 200 is brought into the inductive field of the smartphone, firmware code programmed within the smartphone switches the initiator/responder roles. The standard NFC terms of "Active/Passive" role or modes become confusing. For clarification, we use the "Master device" for the active or initiator mode and "Slave Device" for the passive or responder mode.

Implementation of the system and method for creating a trusted workspace on a commercial mobile device requires three separate processes: (1) the provisioning of the system; (2) the initialization and Boot-up; and (3) the transition into the Trusted Work Space. Each of these will be explained in the paragraphs below with discussions of appropriate background.

It begins with the provisioning of the CM and the user's Smartphone. The user is registered, using the government PKI system or equivalent, for the purpose of establishing his identity. Once accomplished, the certificates are created and the private keys are loaded each onto the CM and the Smartphone, as per normal PKI procedures. The Smartphone is also configured with a Redwall Type 1 Hypervisor, a software program that manages multiple instantiations of the operating system on the single Smartphone computer. The Hypervisor manages the system's processor, memory and other resources to allocate to each operating system its requirements as well as monitoring their activities. Hypervisors are designed for particular processor architectures and may also be called virtualization managers. There is no connection between the operating systems except for the Hypervisor. This allows one virtual machine/OS to operate under the control of one password and the other to operate under the second with no leakage between them, Data entries to each are entirely separate.

In the provisioning process the first user password is created to enable access to the basic Smartphone system. It is stored in the CM for later comparison to the typed entry. Connections to the outside world, Internet, web connections, email, etc. are allowed in this basic system. If keystroke monitoring malware is introduced it will reside on this system, having been downloaded from outlaw websites or introduced via phishing emails. Once passwords are detected and recorded by the malware they would be offloaded through surreptitious connections to the outside world for later use in accessing this portion of the machine.

In addition, during the provisioning, a special random password is created and loaded into a particular register on the CM that the user will only use for access to the second level compartment OS (the second key in the previous illustration). It is not to be used for anything else and will only be called for during the transition between the basic OS and the compartment OS. In fact, it can only be accessed visually on the secure display while using the basic OS, there will be no other way to read the contents of this memory location. And it is only available to one who has successfully identified himself and gained access to the first level/basic OS of the CM and Smartphone.

During the transition process between the two virtual machines, the user has on his CM secure display the special password and as he keys in the command on the Smartphone keyboard to make the switch to the compartment OS and is asked for a password, he then uses the password that he has visually accessed from the CM, thereby completing the transition. Several important notes here; he has obtained the password from the secure display of the special register on the CM and he has not keyed it into the basic OS so it cannot have been compromised or recorded by the malware. The keystroke monitoring malware active on the basic OS does not operate in the compartment OS and cannot detect the entry of the second password. And even though the keystroke monitor has compromised the contents of the basic OS machine, via the first password, it has not compromised the contents of the compartment OS unless the intruder actually has the CM physically in his hands and can read and use the contents of the special register.

The two OSs are needed because the first is required to identify the user and to provide authenticated access to the register containing the password needed for the second OS. The second OS is then needed for the secure data operations.

He can make secure calls between his compartment OS and another Smartphone compartment OS with the same privilege definitions using a VPN connection and a Peer-to-Peer protocol. The called party can validate the privileges of the calling party by an out-of-band enquiry connection to the provisioning station or to a properly configured Certificate Authority or an OCSP server for checking revocation status in the PKI Network. He can also access and operate on databases within the compartment OS without fear of compromise.

The user can now easily switch between the two OSs with the appropriate commands and passwords, still with no information transfer between the two except visual. This might be needed to gain access to information in the outside world or to make normal audio or IP communication connections, again using the basic OS and the a Peer-to-Peer connections when required for sensitive connections. But note that when doing this, all keyboard entries could be compromised.

These very convenient modes of operation can only be realized through the use of the CM because of the visual access to the secure memory on the CM. No other security device has this capability.

CM Secure Bootup of a Commercial Mobile Device

A comprehensive "chain of trust" must be established to verify commercial a mobile device is configured in a known trust state. This security service should protect any physical hardware attacks, protect against malicious code inserted on Smartphone and prevent any non-authentication users from gaining access to apps or data on the Smartphone while in use.

The CM ensures the chain of trust by cryptographically verifying the CM memory, low-level bootloader, secondary bootloader, OS kernel, OS, and finally the mobile device apps.

Figure 7:
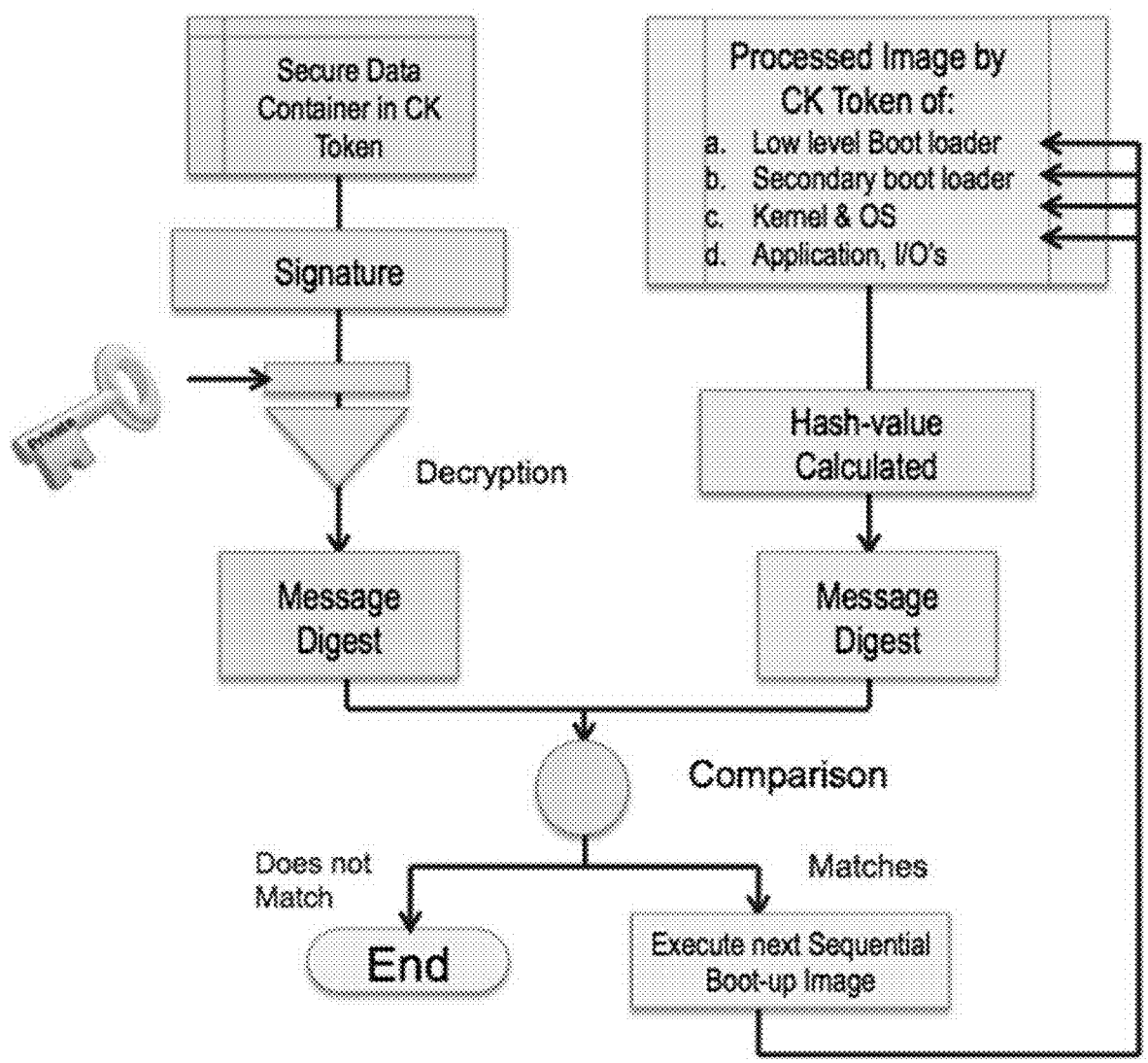
FIG. 7 is a flow chart of a method for boot-up of an NFC cryptographic module as a trusted hardware execution environment for a mobile device in accordance with a preferred embodiment of the present invention.

One primary security function of the CM is to be used as a secure boot-up device as show in FIG. 7. This ensures that the Smartphone boots up from a cold start in a trusted manor. In the first step, the CM verifies the low-level bootloader. By design, this bootloader is as small as possible and has minimal capabilities. The low-level bootloader is stored in the hashed digital signature in the CM memory container during provisioning. At cold start, the CM performs the cryptographic measurements of this startup and compares it with the pre-stored digital signature that proves that the low-level bootloader source code has not been modified or changed.

The next step in the trust chain is to initiate, execute, and validate the recovery Mode or secondary/second stage bootloader. This bootloader is code that is executed before any Operating System starts to run and is more sophisticated then the low level bootloader. Like the low level bootloader, the secondary bootloader is a collection of files that ensure that the CM configures a specific mobile device in the desired trusted state. If additional trusted applications or user privileges were to be issued on a mobile device by the CA, this file and verification routine would be modified whereas the low-level bootloader would stay the same.

The next sequence in the trusted boot-up process is verifying the OS Kernel. The kernel's main function is to control, monitors and manage the mobile device's hardware—especially the peripherals and I/O's. It includes verifying a large block of source code that bridges the mobile devices software and hardware.

In the final boot-up process the CM verifies the mandatory code signing for the OS to the Apps.

To execute a secure boot-up for mobile devices the CM requires not only memory but specific cryptographic functions for trusted processing. Although the trusted processing requirements vary slightly depending on the Operating Systems and Smartphone architecture and capabilities, general core security functions are shared. The core security functions required in the CM include:

1. The SHA algorithm for hashing;
2. The SHA based HMAC for command authentication;
3. Capable of performing atomic security operations (This property means that security operations run to completion and that the intermediate results cannot be modified or exposed);
4. A monotonic counter;
5. Capabilities for secure key storage and secure data storage;
6. Extensions that allow the minimal set of cryptographic engines (SHA, RSA and RNG) to be used to support security protocol;
7. Symmetric cryptographic engines, other hashing algorithms like MD5, and support for additional asymmetric algorithms;
8. Reduced size and power dissipation (To achieve this, architectures that allow the CM to be 100% parasitically powered by the Smartphone via the NFC interface);
9. Internal architecture with 160 bit Platform Configuration Registers (PCR) that are used to store information about the current state of the platform;
10. Support for multiple isolated execution environments in which trusted applications and services are executed within CM; and
11. On reset, volatile memory used by trusted applications and services must be totally zeroized.

The sequential boot-up process described above is largely transparent to the user. It is launched when the user brings the CM to the Smartphone. The user is prompted to select a desired security level, then the sequential steps run in the background and autonomous, only showing verification results on the CM display.

Meeting a criteria level for a trusted environment can be a lengthy and difficult process with great impact if the steps are not segmented. This secure function is modular and can easily be configured to different Smartphone Operating Systems, Smartphone models, and mobile devices.

Cryptographic Authority

Figure 8:
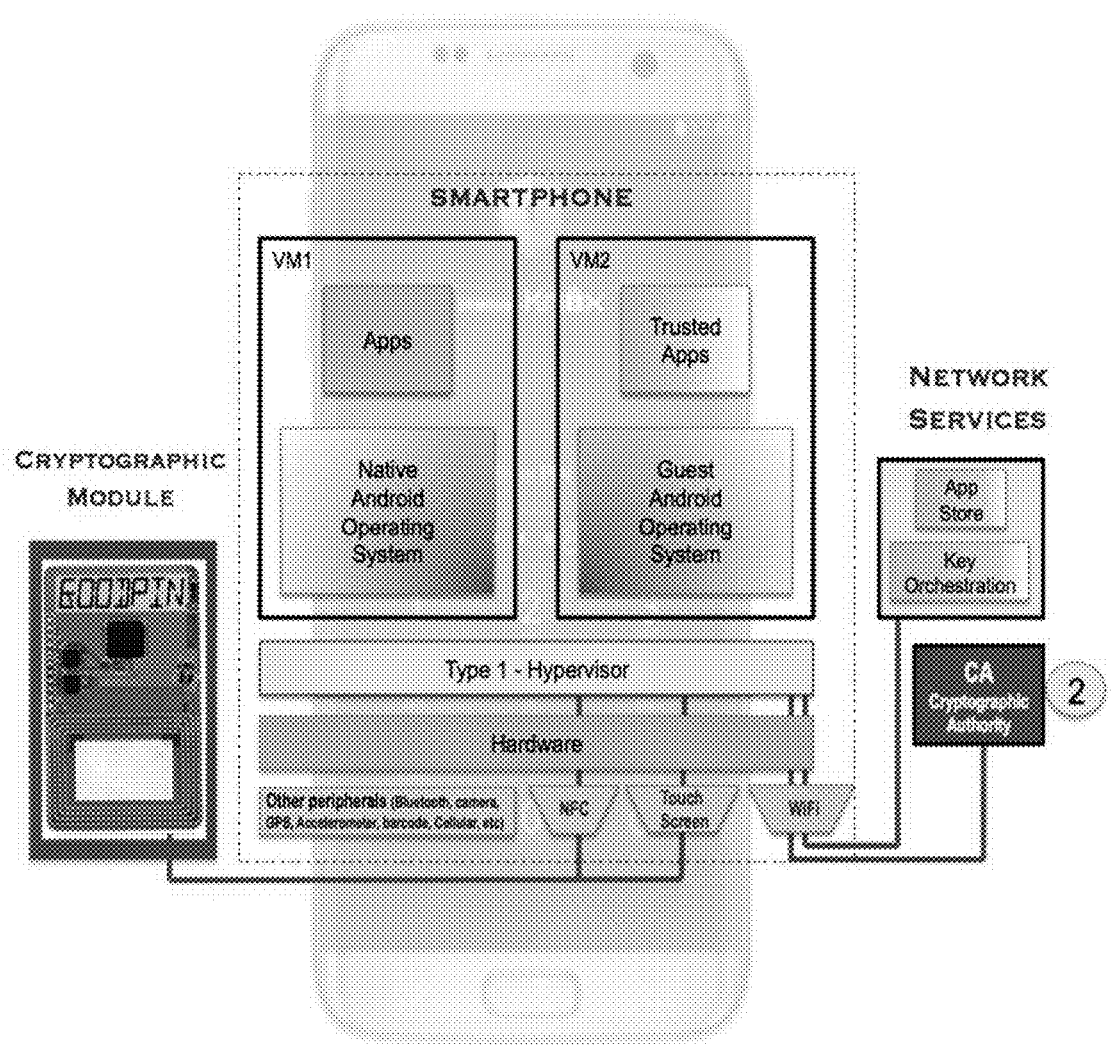
FIG. 8 is a block diagram of a system architecture in accordance with a preferred embodiment of the present invention.

In any mobility architectures, a stand-alone Cryptographic Authority (CA) is defined as a network service. (see red box in FIG. 8) The CA is mandatory for issuance of the root keys to the CM and Smartphone.

During initialization & provisioning, the CA writes immutable data and code in separate memory containers within the Cryptographic Module as well as a split key to the Smartphone. Like the CM, the CA is a standalone trust end point. This mobile security element should always be developed and maintained by the provisioning authority. The highest degree of confidence in the vetting process is used to establish the identity of the individual to whom the PKI cert was issued.

The CA performs identity proofing when first enrolling the user in-person. The provisioning process includes generation of a PKI credential for each access and privilege level permitted, written to data containers in the CM and associated Smartphone.

Identity proofing is more complex and lengthy the first time an account is created and in most cases need not be repeated in its entirety during subsequent access, depending on the details of the relying party policy and the sensitivity and criticality of actions performed using the account. It is the process of establishing confidence that an individual/organization using a credential that is known to the system (e.g., login name, digital certificate) is indeed the person/organization to whom the credential was issued.

The proposed architecture will utilize the existing structure as of a hierarchical PKI. A hierarchical PKI architecture uses a multi-root (PKI) certificated authority model including a sole Root-CA with subordinate intermediate CAs. The subsequent intermediate CAs then have authority to issue credentials to users. Intermediate CAs can issue email (Digital Signature) certificates and authentication certificates.

Under the intermediate CAs are the subscriber's certificates, stored in the CM.

In addition to verifying certificates with a Registration Authority (RA), the ICM can verify certificates or certificate chains. The CM cryptographically verifies the identity of the user to generate a new time-limited credential. Verifying the time limited derived credentials locally greatly simplifies the overhead if done globally by the network RA. The CM also has the capability to update any information or keys or executing revocation requests received from the network CA.

The architectural challenge is integrating the trusted CA securely with the network and CM. The CA is implicitly trusted and employs all layers of protection and isolation.

Creating root key splits, certificates, revocation lists, remote zeroization of keys and other cryptographic and identity management services has always been a separate highly secure process the provisioning authority must maintain and control.

Driving Down the Complexity

Figure 9:
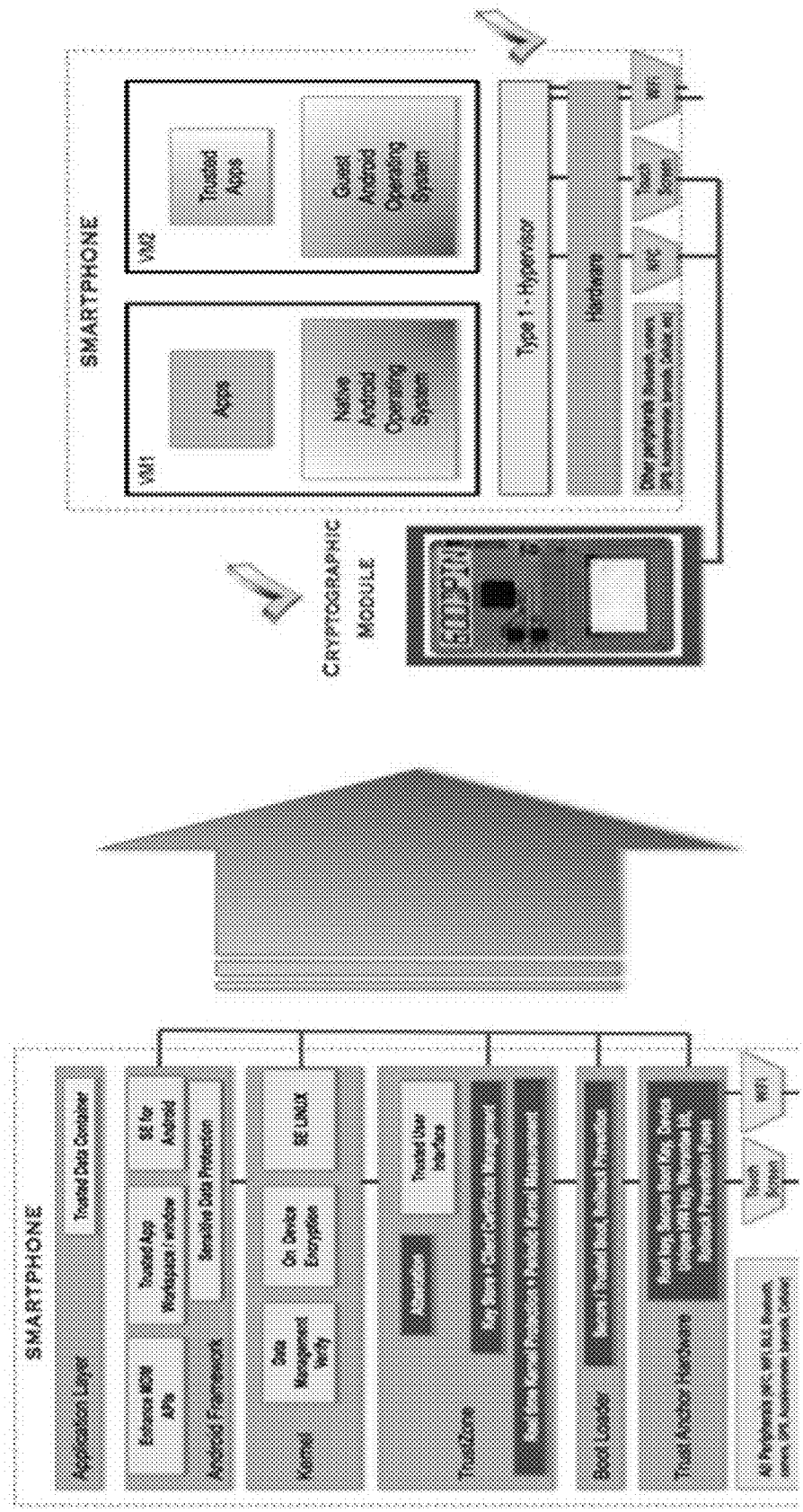
FIG. 9 is a block diagram of an architecture of a system in accordance with a preferred embodiment of the present invention.

Integrating SW/HW security into the Smartphone requires parsing the security capability into all layers of the mobile architecture whereas the architecture employing a Crypto Module conjoined via NFC streamlines the design. In FIG. 9, the block diagram on the left shows the secure firmware (yellow) and the Secure Hardware (red) required if security must be all placed in the phone. The block diagram to the right shows that that only a single hardware component (red) CM and a single firmware Hypervisor within the phone is required when the security is separated from the Smartphone.

Attributes simplifying this mobility architecture include:
The CM and CA are red devices. For secret and higher applications, we assume these are developed and distributed as Government-Off-The-Shelf (GOTS) components. Having these two indispensable trust anchors enable the use of a commercial Smartphone with debatable security.

There are NO necessary red security blocks within the Smartphone. Best-in-Class commercial security features protect the derived key when in use. All root keys, private keys, authentication templates, and signature values are store in the CM and are never exposed to the outside.

The yellow Hypervisor is a TYPE-1 class virtualized machine. The left side Native OS controls the vendor's applications and resources. The right side OS contains trusted apps downloaded via a secure channel from a trusted app store.

Root keys, certificates, users' privileges, and configuration/verification digital signature data are downloaded through the red CA (Cryptographic Authority). The CA is isolated and utilizes a trusted red input path.

Over the Air (OTA) rekeying of Mobile device through yellow Network service is now feasible.

Not all I/O Peripherals with this architecture are the same. The above figure also demonstrates that the NFC, Touch screen/display/keypad, and WiFi are special in comparison to the other base band interfaces like the camera, sensors, etc.

What differentiates these three Smartphone interfaces are;
1. The WiFi interfaces with both the OTA and CA network services through a secure bus. This input is denoted as a multiplexor rather then a simple I/O block to emphasis that the CM controls and ensures isolation between the untrusted and trusted data bus.
2. The NFC interface connects to the using a trusted bus. Although this is a low-level hardware driver, it is typically allowed access and control from the application layer within the Smartphone. To overcome this security vulnerability, upon powering up the CM when within inductive range of the Smartphone, bus control is transferred to the CM. Now the CM is fully isolated and can drive and verify all Smartphone operations.
3. Touch screen/Display/Keypad—The Smartphone's primary interface to the user is the touch screen. This I/O has been a low hanging target for hackers. Malware capturing users keystrokes or bypassing PIN-matching algorithms are extensive and pervasive. Although the CM stores, matches, and displays the result all inside the module, the user while inputting their PIN on the Smartphone display may still be vulnerable to attacks. To stave off these common attacks, a layered approach using a dedicated encrypted path between the touch screen and CM, attestation, and the specialized custom multiplexed port should greatly strengthen the security. Also, the use of the Hypervisor in the transition between the two OSs will prevent the surreptitious recording of the keystrokes of the second password needed to access the Trusted OS workspace.

The Redwall Hypervisor

The roots of the hybrid Hypervisor design began while working with the USG to detect and understand vulnerabilities in commercially evolving TrustZones, Secure Elements (SE), virtualization solutions, Trusted Execution Environment (TEE), SE Linux, containerization/sandboxing, custom hybrids like Samsung KNOX™/GD Protected™, and Type 1 & Type 2 Hypervisors. None of these approaches proved effective, failing to be resistive to even basic attacks. More importantly these solutions are vendor specific requiring changes to the driver code or other proprietary source code if moved to another mobile platforms. Engineering overhead can be many man-years to be operational on a single device and are solutions that cannot be migrated at the rate of commercial mobility.

The Redwall Hypervisor resides below the Smartphone OS at the kernel level. The Hypervisor firmware is a custom Android-based ROM (sometimes referred to as an image) designed to preserve the Smartphone vendor's proprietary code—only small source modifications are required. The custom Hypervisor is ported to a new device and easily modified as new versions of Android become available.

The core security of the Redwall Hypervisor is a trusted security monitor that runs alongside the Linux kernel. This security monitor runs within the hardware of the CM processor while connected. The monitor performs checks on every system call, as well as on the scheduler. Other security functions that are split between the CM & Redwall Hypervisor include:

Isolation of different personas, privileges: The Redwall Hypervisor utilizes the CM Suite B cryptographic processor to provide hardware-based encryption for temporal isolation.

Isolation of data and applications at different levels of sensitivity: The Hypervisor retrieves either the decryption key or decrypted data from the CM and never presents the data in the Smartphone registers or memory at the same time. It is simply not possible to leak data from one persona to another.

Reconfiguring or moving between security levels: The Redwall Hypervisor firmware, called the rCore, is simply an extension of the Linux kernel that enforces polices. The Hypervisor utilizes behavioral analysis to define what is, and is not allowed. Attribute fields for policies are stored in separate memory containers within the CM. Polices for each access level or application drive low level system calls, network locations, and file system locations. These policies can also define and restrict high-level mobile phone resources like Bluetooth, GPS, WiFi, microphone, speaker, and camera.

By constantly monitoring any changes to the kernel, the Redwall Hypervisor easily detects the presence of rogue applications. Attempts to circumvent the OS built-in protections, escalate user privileges, or execute system calls are also easily detected. Recent, one-click rooting APK developed in China for SE Android phones with strict custom polices, as with other zero day exploits, were detected and did not require modifications or patches to the Hypervisor.

The Redwall hybrid Hypervisor occupies a very small footprint as illustrated in the figure above. Only a few Smartphone peripherals require robust trusted paths. These include the NFC to CM, the touchscreen to CM (for user authentication of PIN), the Wifi to CM (for Over-the-air Rekeying and trusted application store), and other I/O port enabling/disabling for each trusted application.

In summary, the Redwall Hypervisor enables secure use of the Smartphone While-In-Use and connected to the Crypto Module. When not connected to the CM, Data-at-Rest is achieved since no root keys or critical user data is stored within the Smartphone. The Redwall Hypervisor provides a trusted data path below the OS for sensitive data AND a flexible control to securely route this data depending upon the enforced security policy.

Figure 10:
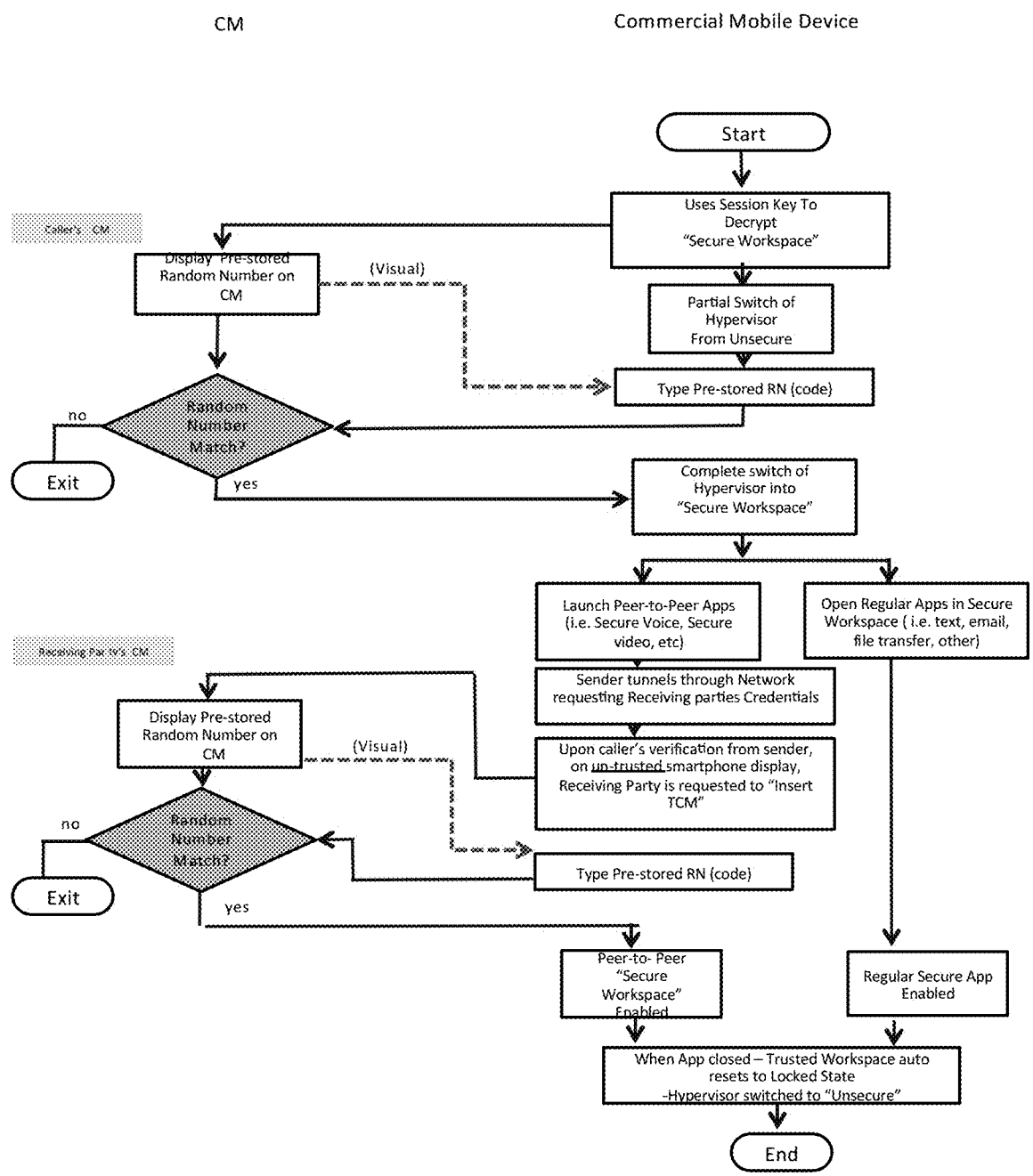
FIG. 10 is a flow chart illustrating a method for provisioning secure code for nested access privileges.

A method in accordance with a preferred embodiment of the present invention for securing a trusted workspace using the Hypervisor is shown in FIG. 10.

Provisioning Secure Code for Nested Access Privileges

The present invention provides for provisioning of secure code for nested access privileges including the following steps:
1—Register users using Government PKI (or equivalent management system), check clearance including access privileges and record details, store in secure mode.
2—Create Secure Code, store by name/use/owner, creation date, for future reference, audit, inclusion in certificates, on OCSP revocation status list.
3—Load secure code onto Alice, Bob's CMs in known registers during the initialization procedure.

Crypto Module Trusted Memory Containers

Figure 11:
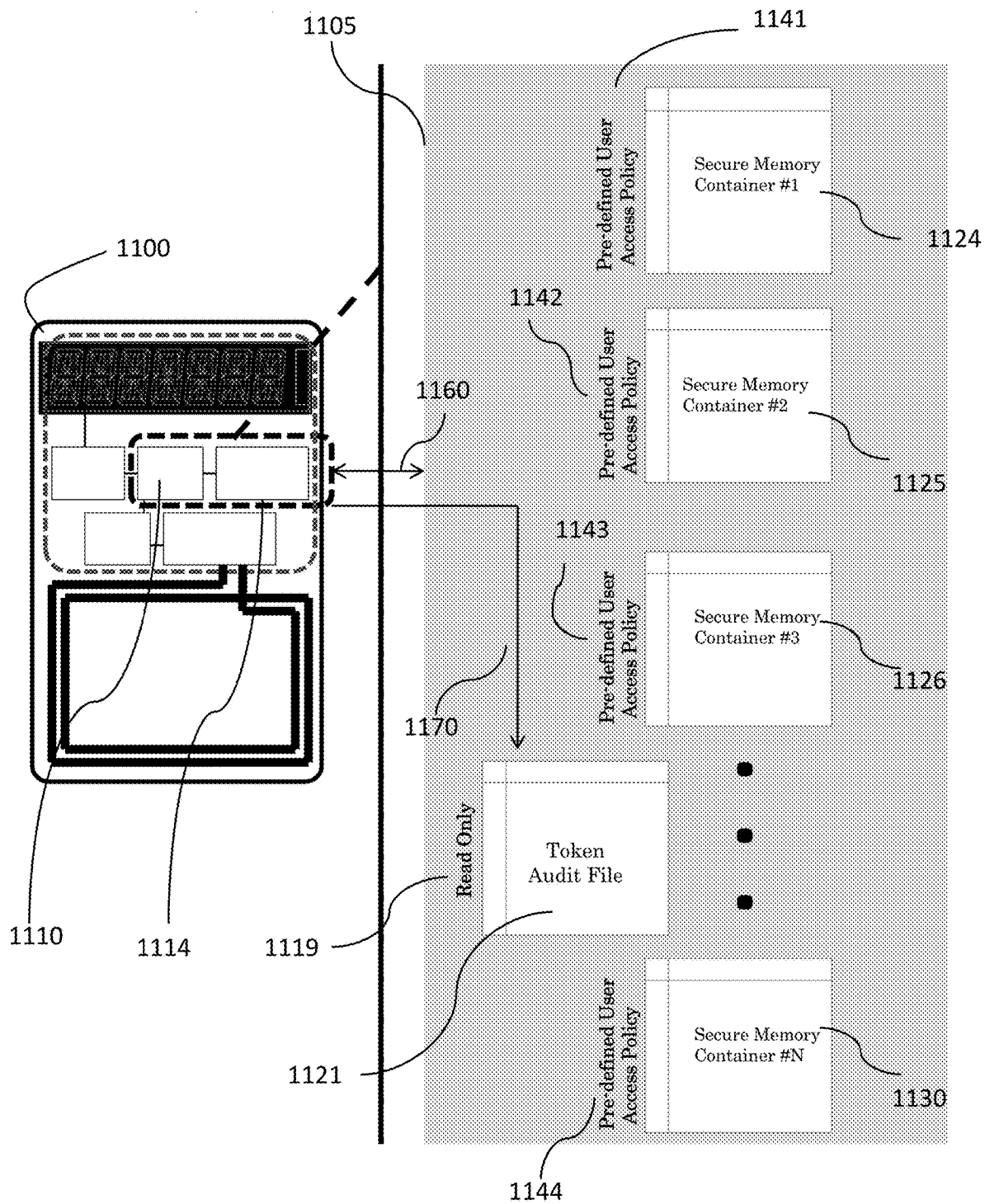
FIG. 11 is a bock diagram of secure memory containers in a secure memory of a cryptographic module in accordance with a preferred embodiment of the present invention.

One aspect of this patent is that much higher security can be achieved when the Crypto Module establishing as the master device, can partition and encrypt/decrypt separate secure memory containers during write/read respectively as illustrated in FIG. 11.

Separate secure memory containers (1124-1130) can be encrypted using the secure crypto processor (1110) embedded within the CM (1100). This memory can be part of the secure crypto processor chip or be expanded using an internal bus to separate non-volatile memory chip(s) (1114).

One security feature of the trusted memory containers is the data encrypted and decrypted by the cryptographic processor can encrypt and decrypt data using any one of the suite of algorithms integrated into the CM.

Yet another security feature of the CM with a trusted NFC is the capability to apply different cryptographic keys and key lengths to secure data in the trusted memory containers providing temporal isolation between containers. For example, a Secret key of length 256 bits can be used for US military communications while a Secret-but-Unclassified key of length of 196 using the identical encryption algorithm type can be used for $1^{st}$ responders.

Yet another security feature of the trusted memory containers is the ability to include predefined header files (1141-1144). Attributes headers for each trusted memory container define access policy, specific user groups permitted to access the data container, sunset key expiration dates, and read/write privileges.

Yet another security feature of the trusted memory containers is the ability to pre-define the Read/Write privileges attributes (1141-1144). These attributes can be pre-defined or dynamic.

Access policy privilege can be automatic write and read only (1117) for a special purpose data container such as a secure log file. The security advantages of a trusted read only log file provides the capability to secure log each and every interaction of the crypto module with the smartphone and user. It provides a method to securely store and forward all trusted transaction even though reach back capability with the network is not available.

Yet another security advantage of the trusted memory containers are the pre-define user authentication access attribute policies that are defined for each data container (1141-1144). For example, one data container can allow read/write access with just a crypto module (one-factor authentication), a second container may require password and crypto module (2-factor authentication), and a third container may require password, CM, and biometric).

Yet another security advantage of the crypto module secure memory containers are they are on a separate isolated trusted data bus (1160). It is very difficult for a malicious player to access data transferring through this data bus with the many defensive security layers like active and passive anti-tamper, encryption, hard-coded user authentication access.

Yet another security advantage of the crypto module secure memory containers are the ability to store multiple user's X. 509 certificate/credentials, pictures, contact list and phone numbers, device commands, text, medical records, videos, and other sensitive data. For example, a user can have a X.509 certificate along with a user's phone number for secret level calls stored in one container (1125). A second data container (1126) can be pre-defined with a different X.509 certificate for top-secret calls associated with the same user.

Yet another security advantage of the crypto module memory containers is the ability to encrypt and parse files into separate data containers, then send encrypted (tunnel through) the smartphone device to a trusted web portal or firewall. This provides the capability of a trusted network entity to verify the contents of the received memory container.

A Special Purpose Data Container—Secure Audit File

During provisioning, the Cryptographic Authority can parse the crypto module trusted memory into many data containers (1105). One special purpose container is the Secure Audit file (1121) with a read/write/forward later to access privileges hard-programmed (1117) by the Cryptographic Authority.

In Auditing, the concern goes beyond keeping the data Secret; it also pertains to not only the data but how and why it was collected. It involves such particulars as independent monitoring of controls, procedures, transaction history and use of resources.

The Audit Trail is the sequence of events concerning the item being audited. One of the more important aspects of auditing is the security of the auditing information and audit trail.

Audit Security is the protection of these audits records from modifications for future trusted (provable) review. Without adequate security of this information, it is difficult to prove without a doubt that the information is true, accurate and has not been modified.

The basis of this patent is that the data protected by the Secure Memory of the crypto module is protected to the extent that it could be used to support any auditing process and that authenticated persons on the Secure Display can view the trail of this audit data securely.

Yet another security advantage of the crypto module is the ability for audit events that need to be recorded and for non-repudiation. For example, transaction history with time stamp, transaction counts, chain of trust, Sarbanes Oxley (SOX) compliance, medical procedure records, document viewing records, the trail of a document having been opened by whom and when, sequence of events, monitoring integrity checks and recording their occurrence.

In this class of secure audit file, data can be a rolling tally, i.e., numbers of event over a past period of time, compliance audits—records of actions by host—securely recording successful completion of required process steps (with witness).

Yet another security element of the crypto module secure audit containers are that it offers the opportunity for a witness to securely affix his signature to the audit trail contained within the Secure Memory. This witness signature process can be accomplished through the use of the Public Key techniques.

Yet another security element of the crypto module secure audit containers are for time cards, verified time in and out, similar to the old paper time cards and printing clock, except now it is electronic. The audit trail is secure (unalterable) and time stamps can be recorded separately for performance of different tasks. Since the Crypto Module does not have a clock, a connection would have to be made via a secure link to a real-time clock for this information.

Yet another security element of the crypto module secure audit containers is document control, access to facility and use of copy machines if so equipped, with time stamps.

Yet another security element of the crypto module secures audit containers is use of resources as in, for example, gas pumps that communicate an electronic record instead of a paper receipt.

Yet another security element of the crypto module secure audit containers is passport with border control records, two-way; both the passport holder and the border control agent hold audits of the proceedings.

Yet another security element of the crypto module secures audit containers is property checkout and check-in, equivalent to an electronic library card.

Yet another security element of the crypto module secures audit containers is proof of ownership, as in an electronic automobile registration.

Yet another security element of the crypto module secures audit containers is proof of payment in that the card holder has an electronic transaction record with secure time stamp, if needed.

Yet another security element of the crypto module secure audit containers is automatic security event monitoring of any known or suspected violations of physical security, network or "hacking" attacks.

Yet another security element of the crypto module secure audit containers is physical access to, loading, zeroizing, transferring keys to or from, backing-up, acquiring or destroying cryptographic modules.

Yet another security element of the crypto module secure audit containers is installation, access and modifications to configuration files, security profiles, and administrator privileges for operating systems.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for creating a trusted workspace on a mobile device using a cryptographic security token comprising a secure microprocessor, a secure bus connected to said secure microprocessor, a bus isolation microcontroller connected to said secure bus, said bus isolation microcontroller comprising firmware for controlling communications through said secure bus to said secure microprocessor, a first NFC antenna connected to said bus isolation microcontroller, and a second NFC antenna connected to said secure microprocessor, wherein said secure microprocessor and said bus isolation microcontroller are powered by energy received through said first NFC antenna and said second NFC antenna, and wherein said cryptographic security token receives data from outside said cryptographic security token only through said first NFC antenna, the method comprising the steps of:
   provisioning the cryptographic security token and the mobile device, wherein the provisioning comprises:
      registering a user in the cryptographic security token to establish an identity of the user;
      creating authentication certificates associated with said user;
      loading private keys on to the cryptographic security token and the mobile device;
      creating a first user password to enable access to a basic system on said mobile device and storing the first user password in the cryptographic security token;
      creating a random password and loading said random password into a register on the cryptographic security token, the random password only being accessible to the user through a secure display on the cryptographic security token; and
      storing a low-level bootloader in the cryptographic security token;
   initializing and booting up the cryptographic security token and the mobile device; and
   transitioning the cryptographic security token and the mobile device into the trusted work space.

2. The method for creating a trusted workspace on a mobile device according to claim 1, wherein the initializing and booting up of the cryptographic security token comprises:
   verifying the low-level bootloader with the cryptographic security token;
   initiating, executing, and validating a secondary bootloader;
   verifying an operating system kernel of the cryptographic security token, wherein the verifying of the operating system kernel comprises verifying a large block of source code that bridges software and hardware in the mobile device; and
   verifying mandatory code signing for an operating system of the cryptographic security token to applications in the mobile device.

3. The method for creating a trusted workspace on a mobile device according to claim 1, wherein the transitioning the cryptographic security token and the mobile device into the trusted work space comprises:
   writing immutable data and code in separate memory containers within the cryptographic security token, and writing a split key to the mobile device.

* * * * *